United States Patent
Braun et al.

(10) Patent No.: US 6,993,255 B2
(45) Date of Patent: Jan. 31, 2006

(54) METHOD AND APPARATUS FOR PROVIDING ADAPTIVE ILLUMINATION

(75) Inventors: Ori J. Braun, Palo Alto, CA (US); Giora Yahav, Haifa (IL)

(73) Assignee: 3DV Systems, Ltd., Yokneam (IL)

( * ) Notice: Subject to any disclaimer, the term of this patent is extended or adjusted under 35 U.S.C. 154(b) by 0 days.

(21) Appl. No.: 10/332,646

(22) PCT Filed: Jul. 9, 2001

(86) PCT No.: PCT/IL01/00627

§ 371 (c)(1),
(2), (4) Date: Oct. 2, 2003

(87) PCT Pub. No.: WO02/04247

PCT Pub. Date: Jan. 17, 2002

(65) Prior Publication Data

US 2004/0114921 A1    Jun. 17, 2004

Related U.S. Application Data

(63) Continuation-in-part of application No. PCT/IL00/00404, filed on Jul. 9, 2000, which is a continuation-in-part of application No. 09/250,322, filed on Feb. 16, 1999, now Pat. No. 6,445,884.

(51) Int. Cl.
*G03B 15/03* (2006.01)
*F21V 1/00* (2006.01)
*B60Q 1/08* (2006.01)

(52) U.S. Cl. .............................. 396/61; 362/4; 362/18; 362/276; 362/466; 396/164

(58) Field of Classification Search ............... 396/61, 396/106, 109, 159, 164, 182, 100; 348/61, 348/135, 169, 370, 371, 136, 143, 152; 362/11, 362/276, 464–466, 4, 16–18; 382/103; 315/149
See application file for complete search history.

(56) References Cited

U.S. PATENT DOCUMENTS 3,571,493 A    3/1971   Baker et al. ................. 353/85

(Continued)

FOREIGN PATENT DOCUMENTS

DE    40 26 956    3/1992

(Continued)

OTHER PUBLICATIONS

Clark, V.; "Large Area Array with Non-Linear Active Current Mode Pixels"; talks given at 1996 SSCTC Workshop on CMOS Imaging Technology; Retrieved from the Internet on: <http://www.ece.neu.edu/eds/SSCTC/vince.html>;  23 Pages.

(Continued)

*Primary Examiner*—W. B. Perkey
(74) *Attorney, Agent, or Firm*—Fenster & Co.

(57) ABSTRACT

An illumination system (20, 72, 110, 142) for illuminating a scene comprising: an illuminator (24, 74, 116) having a plurality of substantially contiguous independently controllable light (26, 76) providing regions each of which provides light that illuminates a different region of the scene; optics (30) that directs light from the illuminator to the scene; a range finder (22, 64, 112) that determines distances to regions of the scene; and a controller (28, 29, 118) that controls the plurality of light providing regions to provide light for illuminating the scene responsive to distances determined by the range finder (22, 64, 112).

52 Claims, 8 Drawing Sheets

U.S. PATENT DOCUMENTS

| | | | | |
|---|---|---|---|---|
| 3,629,796 | A | 12/1971 | Brownscombe et al. | 367/9 |
| 3,734,625 | A | 5/1973 | Aagard | 356/369 |
| 3,834,816 | A | 9/1974 | Pedinoff | 356/28 |
| 4,143,263 | A | 3/1979 | Eichweber | 398/170 |
| 4,185,191 | A | 1/1980 | Stauffer | 250/204 |
| 4,408,263 | A | 10/1983 | Sternlicht | 362/189 |
| 4,410,804 | A | 10/1983 | Stauffer | 250/208.2 |
| 4,477,184 | A | 10/1984 | Endo | 356/141.1 |
| 4,501,961 | A | 2/1985 | Stauffer | 356/4.03 |
| 4,591,918 | A | 5/1986 | Hisano | 348/343 |
| 4,680,579 | A | 7/1987 | Ott | 348/755 |
| 4,687,326 | A | 8/1987 | Corby | 356/5.01 |
| 4,734,733 | A | 3/1988 | Clapp et al. | 396/164 |
| 4,734,735 | A | 3/1988 | Haneda | 399/231 |
| 4,769,700 | A | 9/1988 | Pryor | 348/120 |
| 4,780,732 | A | 10/1988 | Abramov | 347/239 |
| 4,916,324 | A | 4/1990 | Meier | 250/559.38 |
| 4,935,616 | A | 6/1990 | Scott | 250/214 VT |
| 4,959,726 | A | 9/1990 | Miida et al. | 348/350 |
| 4,971,413 | A | 11/1990 | Inoue | 359/217 |
| 4,985,816 | A * | 1/1991 | Seko et al. | 362/303 |
| 4,991,953 | A | 2/1991 | Pflibsen et al. | 351/206 |
| 5,009,502 | A | 4/1991 | Shih et al. | 356/152.1 |
| 5,056,914 | A | 10/1991 | Kollodge | 356/5.05 |
| 5,081,530 | A | 1/1992 | Medina | 348/46 |
| 5,090,803 | A | 2/1992 | Ames et al. | 356/139.03 |
| 5,110,203 | A | 5/1992 | MacCabee | 356/5.04 |
| 5,157,451 | A | 10/1992 | Taboada et al. | 356/5.05 |
| 5,198,877 | A | 3/1993 | Schulz | 356/614 |
| 5,200,793 | A | 4/1993 | Ulich et al. | 356/5.01 |
| 5,200,931 | A | 4/1993 | Kosalos et al. | 367/88 |
| 5,216,259 | A | 6/1993 | Stern et al. | 250/559.38 |
| 5,218,485 | A | 6/1993 | Malm | 359/885 |
| 5,220,164 | A | 6/1993 | Lieber et al. | 356/5.06 |
| 5,225,882 | A | 7/1993 | Hosokawa et al. | 356/5.06 |
| 5,243,553 | A | 9/1993 | Flockencier | 356/5.03 |
| 5,253,033 | A | 10/1993 | Lipchak et al. | 356/4.01 |
| 5,255,087 | A | 10/1993 | Nakamura et al. | 348/71 |
| 5,265,327 | A | 11/1993 | Faris et al. | 29/285 |
| 5,307,200 | A | 4/1994 | Yoshida | 359/248 |
| 5,334,848 | A | 8/1994 | Grimm | 250/548 |
| 5,343,391 | A | 8/1994 | Mushabac | 433/76 |
| 5,345,266 | A | 9/1994 | Denyer | 348/300 |
| 5,351,677 | A | 10/1994 | Kami et al. | 600/109 |
| 5,408,263 | A | 4/1995 | Kikuchi et al. | 348/68 |
| 5,434,612 | A | 7/1995 | Nettleton et al. | 348/68 |
| 5,448,330 | A * | 9/1995 | Takagi | 396/106 |
| 5,455,451 | A | 10/1995 | Usagawa et al. | 257/661 |
| 5,499,168 | A | 3/1996 | Cochard et al. | 362/466 |
| 5,587,832 | A | 12/1996 | Krause | 359/385 |
| 5,828,485 | A | 10/1998 | Hewlett | 359/291 |
| 5,844,588 | A | 12/1998 | Anderson | 347/135 |
| 5,938,319 | A * | 8/1999 | Hege | 362/459 |
| 5,969,754 | A * | 10/1999 | Zeman | 348/136 |
| 6,023,365 | A | 2/2000 | McDonald | 359/291 |
| 6,057,909 | A * | 5/2000 | Yahav et al. | 365/5.04 |
| 6,091,905 | A | 7/2000 | Yahav et al. | 396/106 |
| 6,100,517 | A | 8/2000 | Yahav et al. | 250/208.1 |
| 6,654,556 | B2 * | 11/2003 | Braun et al. | 396/96 |

FOREIGN PATENT DOCUMENTS

| | | |
|---|---|---|
| DE | 44 20 637 | 12/1995 |
| EP | 0 313 518 | 4/1989 |
| EP | 0 436 267 | 7/1991 |
| EP | 0 465 806 | 1/1992 |
| EP | 0 474 264 | 3/1992 |
| EP | 1 006 386 | 6/2000 |
| FR | 2 713 165 | 6/1995 |
| WO | WO 89/12837 | 12/1989 |
| WO | WO 98/26583 | 6/1998 |
| WO | WO 00/19705 | 4/2000 |
| WO | WO 00/36372 | 6/2000 |
| WO | WO 01/01038 | 1/2001 |
| WO | WO 01/18563 | 3/2001 |
| WO | WO 02/49366 | 6/2002 |

OTHER PUBLICATIONS

Vietze, O. et al.; "Image Sensing with Programmable Offset Pixels for Increased Dynamic Range of More Than 150 dB"; SPIE, vol. 2654; pp. 93-98.

De Long, M. L. et al.; "Underwater Laser Imaging System (UWLIS)";Proceeding of the Autonomous Vehicles in Mine Countermeasures Symposium; pp. 6-103 thru 6-111; Apr. 1995.

Anthes, J. P. et al.; "Non-Scanned LADAR Imaging and Applications"; SPIE, vol. 1936 Applied Laser Radar Technology (1993); pp. 11-21.

Hill, L. S. et al.; "A Multi-Detecting Laser Rangefinder Capable of Range Imaging": Applied Optics and Optoelectronics; University of York; Abstract Book; pp. 208-210; Sep. 1994.

Burns, H. N. et al.; "Compact, 625-Channel Scannerless Imaging Laser Radar Receiver"; SPIE, vol. 2748; Jun. 1996; pp. 39-46; Conference date Apr. 10, 1996; Abstract in 1995.

Strand, M. P.; "Underwater Electro-Optical System for Mine Identification"; Proceedings of the Autonomous Vehicles in Mine Countermeasures Symposium; pp. 6-238 thru 6-247.

Garcia, P. et al.; "Characterization of a Scannerless LADAR System"; SPIE, vol. 1936 Applied Lasar Radar Technology (1993); pp. 23-29.

Muguira, M. R. et al.; "Scannerless Range Imaging with a Square Wave"; SPIE, vol. 2472; pp. 106-113; Conference date Apr. 1995.

Swartz, B. A.; "Diver and ROV Deployable Laser Range Gate Underwater Imaging Systems"; Underwater Intervention '93; Conference Proceedings; pp. 193-199; 1993.

Christie, S. et al.; "Design and Development of a Multi-Detecting Two-Dimensional Ranging Sensor"; Measurement Science & Technology; vol. 6; No. 9; pp. 1301-1308; Sep. 1995.

Sackos, J. et al.; "The Emerging Versatility of a Scannerless Range Imager"; SPIE, vol. 2748; pp. 47-48; Conference Date Apr. 1996.

Kawakita, M. et al.; "Axi-Vision Camera: A Three-Dimension Camera"; SPIE, vol. 3958 (2000); pp. 61-70; XP-000987367.

* cited by examiner

METHOD AND APPARATUS FOR PROVIDING ADAPTIVE ILLUMINATION

RELATED APPLICATIONS

The present application is a US National Application of PCT/IL01/00627, filed on Jul. 9, 2001. This application is also a continuation-in-part of PCT Application No. PCT/IL00/00404, filed on Jul. 9, 2000, which is a continuation-in-part of U.S. Application No. 09/250,322, filed on Feb. 16, 1999, now U.S. Pat. No. 6,445,884.

FIELD OF THE INVENTION

The present invention relates to adapting illumination of a scene responsive to features and characteristics of the scene and in particular to automatically adapting the illumination to characteristics and features of the scene.

BACKGROUND OF THE INVENTION

A visual impression of a scene and objects and features in the scene is generally a function of illumination of the scene. Objects in a scene that are illuminated so that they contrast strongly with their local background tend to capture our attention. Acuity with which the eye is able to distinguish details of features in a scene and impressions of features of a scene are generally dependent upon the power spectrum of light illuminating the features. For example, color of a woman's dress and her fashion accessories may appear harmonious in one light and discordant in another light. In addition, cultural convention has coded color with information that affects our reason and emotions and these cultural conventions affect the way colors in a scene generate responses to the scene. Red, yellow and green lights not only tell us when to stop at traffic lights but also, alert our reason and emotions to various degrees of danger, or lack thereof.

It is therefore seen that when illuminating a scene for a particular desired application, generally many different variables have to be considered and taken into account. As a result, achieving effective illumination of a scene is often a relatively complicated, subtle and arduous task.

U.S. Pat. No. 5,828,485 describes an illumination device for stage lighting comprising an image source that acquires an image of an actor on a stage and an array of digital micromirrors for directing light from a suitable light source to the stage. The array of micromirrors is controlled responsive to the image of the actor to project different shape and color light beams for illuminating the actor. The illumination device is controllable to follow the actor as he or she moves on the stage and illuminate the actor accordingly. The patent notes that characteristics of the projected light beam, e.g. its shape and color can be controlled by "image processing software such as Adobe photoshop™, Kai's power tools™ and the like".

U.S. Pat. No. 4,501,961 describes a range finder having a photosurface for imaging an object, whose distance from the range finder is to be determined, and an array of LEDs for illuminating the object. To prevent parallax, light from the array of LEDs is focussed on the object by a same lens that collects light from the object and focuses the collected light on the photosurface. A controller controls the array of LEDs to illuminate the object with a pattern of light which when imaged on the photosurface provides information for determining range to the object. The range finder comprises a negative lens to adjust the size of the illumination pattern to the size of the photosurface.

SUMMARY OF THE INVENTION

An aspect of some embodiments of the present invention relates to providing an illumination system that comprises an illuminator having an array of substantially contiguous, independently controllable light providing regions and a range finder for determining distances to regions of the scene. Each of the light providing regions, hereinafter referred to as "luxels", illuminates a different region of the scene. The illumination system comprises a controller that controls the luxels to provide light responsive to distances determined by the range finder.

Preferably, the array of luxels in the illuminator is a planar array and the illumination system comprises optics that directs light from the luxels in the array to illuminate the scene. Optionally, the illuminator is similar to an illuminator comprising luxels used to provide light for a 3D range-camera described in PCT/IL00/00404, the disclosure of which is incorporated herein by reference. The optics has a focal plane, referred to as an "illumination plane", towards which the optics focuses light from the luxels. Light from each luxel is focused to a different region of the illumination plane. Assuming that the luxels are substantially contiguous, the different regions of the illumination plane towards which light from different luxels is focused are substantially contiguous and non-overlapping. For surfaces of a scene illuminated by the illumination system that are located relative to the illumination plane within a depth of field of the optics, the optics focuses light from the luxels to form relatively sharp images of the luxels on the surface.

In some embodiments of the present invention, position of the illumination plane relative to the illumination system is adjustable. In some embodiments of the present invention, position of the illumination plane is fixed. Optionally the illumination plane is fixed at infinity. Optionally, the illumination plane is located at a distance from the illumination system that is equal to an average of distances to scenes that the illumination system is intended to illuminate.

According to an aspect of some embodiments of the present invention, the controller controls luxels so that intensity of light provided by a luxel is substantially proportional to the square of a distance from the array of luxels to a region of the scene illuminated by the luxel. As a result, intensity of light (joules/$m^2$) incident on regions of the scene is substantially uniform.

Optionally, each luxel can be controlled to provide white light and/or R, G or B light. In some embodiments of the present invention a luxel can be controlled to provide IR light. In some embodiments of the present invention the luxels are grouped into groups of four substantially contiguous luxels. Each luxel in a group of luxels provides a different one of R, G, B and IR light.

In some embodiments of the present invention, the range finder comprises a 3D range-camera such as, for example, a 3D range-camera described in PCT Application PCT/IL00/0404 referenced above, and in PCT Publications WO 00/36372, WO 00/19705, WO 01/18563 and U.S. Pat. Nos. 6,057,909, 6,091,905 and 6,100,517, the disclosures of all of which are incorporated herein by reference. Range-cameras known in the art other than those described in these documents can be used in the practice of the present invention.

In 3D range-cameras described in the referenced documents, a train of light pulses is radiated by a range camera light source to illuminate the scene. Following each light pulse the camera is gated open to receive light reflected from the light pulse by regions in the scene and image the received light on a photosurface comprised in the camera.

Distance to a region is determined from timing of the gates with respect to emission times of the light pulses and a total amount of light from the region that is received and imaged during the gates on a pixel of the photosurface that images the region.

In some embodiments of the present invention, the array of luxels in the illumination system functions as the range camera light source. The illumination system controller controls luxels in the array to generate the train of light pulses that illuminates the scene. Optionally, the illumination system comprises a fast shutter, which the controller controls to shutter light from the array of luxels to generate the train of light pulses. Optionally, luxels controlled to generate the train of light pulses provides infrared (IR) light.

In some embodiments of the present invention the 3D range-camera photosurface is boresighted with the illumination system optics so that a virtual image of the photosurface is substantially coincident with the illuminator. The illumination system optics, which directs light from the luxels to illuminate a scene, therefore also collects light from the scene and focuses the collected light on the photosurface. For such cases, preferably, the controller gates the photosurface in synchrony with the fast shutter so that when the fast shutter is open to generate a light pulse the photosurface is gated closed. This prevents halo and back-scatter from light provided by the luxels from being sensed by pixels in the photosurface and interfering with distance measurements. U.S. application Ser. No. 09/250,322 the disclosure of which is incorporated herein by reference shows methods of bore sighting a photosurface with a source of light.

In some embodiments of the present invention a region of the illumination plane of the illumination system that is illuminated by a luxel is imaged on a single pixel of the photosurface. In some embodiments of the present invention, a region of the illumination plane illuminated by a luxel is imaged on a group of contiguous pixels of the photosurface.

Optionally, the photosurface is gated by a fast shutter, which may operate, by way of example, in a manner described in PCT Publication WO 01/18563. Optionally, the photosurface comprises pixels, each of which has a circuit controllable to turn on and turn off the pixel. The photosurface is gated on and gated off as required by turning on and turning off the pixels. Photosurfaces comprising pixels having circuits that are controllable to turn on and turn off the pixels are described in PCT publications WO 00/36372 and WO 00/19705, referenced above.

In some embodiments of the present invention, the illumination system controller comprises a pattern recognition application that processes images of a scene imaged on the photosurface to identify features of the scene and objects in the scene. The controller controls the luxels to illuminate the scene responsive to the identified features and/or objects.

According to an aspect of some embodiments of the present invention, the illumination system determines a velocity of an object in a scene imaged by the illumination system and the controller controls the luxels responsive to the determined velocity. In some embodiments of the present invention, the illumination system determines a component of velocity of the object in directions towards or away from the illumination system by determining distance to the object at a plurality of times. The controller determines a time rate of change of the distance from the determined distances to determine the component velocity and then controls the luxels responsive to the determined component of velocity.

In some embodiments of the present invention, the controller determines a component of velocity of an object using distance of the object from the illumination system and a time rate of change of position of an image of the object in an image of the scene. The component of velocity determined from motion of the image of the object is substantially perpendicular to the component of velocity of the object determined from measurements of distance of the object from the illumination system.

In some embodiments of the present invention, the controller of the illumination system is programmable to provide different desired lighting effects and/or to identify different types of objects and features of a scene that is illuminated by the illumination system.

An aspect of some embodiments of the present invention relates to providing a light bulb comprising an illumination system in accordance with an embodiment of the present invention. Optionally, the light bulb is suitable for insertion in a conventional light bulb socket. The light bulb is optionally programmable to identify a particular object and/or feature of its environment and selectively illuminate the object or feature accordingly.

For example, in accordance with an embodiment of the present invention, the light bulb may be programmed to identify and determine distances to pictures on a wall of a room in which the light bulb is located. In some embodiments of the present invention, the light bulb then adjusts illumination that it provides so that intensity of light illuminating each of the pictures is substantially the same. In some embodiments of the present invention, the light bulb adjusts color of light that it provides to illuminate each picture responsive to a color pattern of the picture. Optionally, the bulb first illuminates the picture with white light and determines color components of the picture from an image of the picture formed on the photosurface. The light bulb may then illuminate the picture with light that "brings out" the natural colors of the picture.

An aspect of some embodiments of the present invention relates to providing an automotive headlight for a vehicle. The headlight comprises an illumination system in accordance with an embodiment of the present invention and provides intelligent adaptive illumination of a roadway and neighboring regions of the roadway, as seen by a driver of the vehicle. The portion of the roadway and neighboring regions thereof are hereinafter referred to as a "roadway scene".

According to an aspect of some embodiments of the present invention, a pattern recognition application comprised in the headlight, or in the illumination system controller or an associated controller, identifies road signs. Optionally, when a road sign is identified, the controller controls the luxels to adjust hue, saturation and intensity of light illuminating the road sign so as to "spotlight" the road sign and improve its readability. In some embodiments of the present invention, the headlight is programmed to spotlight roadway signs that are farther from the vehicle with greater intensity light than roadway signs nearer to the vehicle so that roadway signs at different distances have substantially a same visibility. Alternatively, identified roadway signs may not be spotlighted until they are within a predetermined range of the driver's vehicle.

According to an aspect of some embodiments of the present invention, the pattern recognition application identifies oncoming vehicles and automatically adjusts illumination provided by the luxels to prevent glare from light provided by the luxels from blinding a driver of the oncoming vehicle.

According to an aspect of some embodiments of the present invention, the headlight determines a closing speed of the vehicle to objects in the roadway scene and controls light from the luxels that illuminates the objects responsive to the determined closing speed. For example, the headlight can determine if the vehicle is closing too quickly on a preceding vehicle in front of the driver's vehicle. Optionally, the headlight alerts the driver to a dangerous closing speed by illuminating the preceding vehicle with a suitable spatial and/or temporal illumination pattern e.g. by illuminating the back of the preceding vehicle with intense flashing red light.

Whereas, the light bulb and headlight in accordance with an embodiment of the present invention are described as having range measuring capability, in some embodiments of the present invention, a light bulb or headlight in accordance with an embodiment of the present invention does not have a ranging capability. The bulb or headlight preferably comprises a photosurface on which an image of a scene illuminated by the bulb or headlight is imaged. The bulb or headlight optionally provides substantially all the functions that the bulb or headlight described above provides except for those functions dependent upon range measurements.

It is noted that whereas the headlight and bulb as described above are shown as monolithically integrated structures, a head light or bulb, in accordance with embodiments of the present invention can have distributed components. For example, a headlight, in accordance with an embodiment of the present invention may have its illuminator conventionally at the front of the fender, its range-camera in the grillwork and its controller under the dashboard. Similarly a bulb, in accordance with an embodiment of the present mounted in a chandelier may have a controller located in a wall unit, its illuminator in a conventional socket of the chandelier and its 3D-range camera mounted in the chandelier structure.

There is therefore provided in accordance with an embodiment of the present invention, an illumination system for illuminating a scene comprising: an illuminator having a plurality of substantially contiguous independently controllable light providing regions each of which provides light that illuminates a different region of the scene; optics that directs light from the illuminator to the scene; a range finder that determines distances to regions of the scene; and a controller that controls the plurality of light providing regions to provide light for illuminating the scene responsive to distances determined by the range finder.

Optionally, the range finder comprises a 3D range-camera, the 3D range-camera comprising a gated photosurface having pixels and collecting optics that collects light from the scene and images the collected light on the photosurface.

Optionally, there is a one to one correspondence between light providing regions and pixels of the photosurface and light from a region of the scene illuminated with light from substantially only one light providing region is imaged substantially only on the pixel corresponding to the light providing region.

Alternatively, there is optionally a one to many correspondence between light providing regions and pixels so that each light providing region corresponds to a group of contiguous pixels and wherein light from a region of the scene illuminated by a light providing region is imaged substantially only on the light providing region's corresponding group of pixels.

Alternatively, there is optionally a many to one correspondence between light providing regions and pixels so that each pixel corresponds to a group of contiguous light providing regions and wherein light from a region of the scene illuminated by light from a group of light providing regions is imaged substantially only on the group's corresponding pixel.

In some embodiments of the present invention, the collecting optics of the 3D range-camera is the optics that directs light to the scene. Optionally, the photosurface is boresighted with the optics that directs light to the scenes so that a virtual image of the photosurface is substantially coincident with the illuminator.

In some embodiments of the present invention, the illumination system and comprises a shutter controllable to shutter light from the illuminator. Optionally, the controller controls the shutter to shutter light from the illuminator so as to provide a train of light pulses that illuminates the scene.

In some embodiments of the present invention, the controller turns on and turns off light providing regions of the plurality of light providing regions to provide a train of light pulses that illuminates the scene.

In some embodiments of the present invention, the illuminator provides IR light and the train of light pulses comprises IR light pulses.

In some embodiments of the present invention, the controller gates the photosurface on for at least one gate period at a time following a time at which each light pulse in the light pulse train is provided. Optionally, the controller determines a distance to a region of the scene using an amount of light incident on a pixel of the photosurface that images the region during the at least one gate following each light pulse in the light pulse train.

In some embodiments of the present invention, the controller comprises a pattern recognition application which the controller uses to identify features and/or objects in images of the scene formed on the photosurface. Optionally, the controller controls the light providing regions to provide light that illuminates the scene responsive to one or both of features and objects that it identifies in the image. Alternatively or additionally, the controller controls the 3D range-camera to acquire a first image of the scene at a first time and a second image of the scene at a second time and identifies a feature of the scene that has a location in the second image different from its location in the first image. Optionally, the controller uses the difference in location of the feature, a difference between the first and second times, and distance of the feature from the illumination system to determine a transverse component of velocity of the feature in a direction substantially perpendicular to a direction along which the illumination system illuminates the feature. Optionally, the controller controls the light providing regions to provide light that illuminates the scene responsive to the transverse component of velocity.

In some embodiments of the present invention, the controller controls the range finder to determine distances to a region of the scene at a first time and a second time and uses a difference in the distances and a difference between the first and second times to determine a radial component of velocity of the region along a direction substantially parallel to a direction along which the illumination system illuminates the region. Optionally, the controller controls the light providing regions to provide light that illuminates the scene responsive to the radial component of velocity.

In some embodiments of the present invention, the controller controls the light providing regions to illuminate only regions of the scene that are located within a desired range of distances from the illumination system.

In some embodiments of the present invention, the controller controls intensity of light provided by light providing regions responsive to distances determined by the range finder.

In some embodiments of the present invention, the controller controls the light providing regions so that relative intensity of light provided by the illuminator that illuminates two different regions of the scene is substantially proportional to a ratio of the squares of their respective distances from the illumination system.

In some embodiments of the present invention, the optics that directs light to the scene focuses light from the illuminator to a plane whose distance relative to the illumination system is adjustable. Optionally, the controller controls distance of the plane from the illumination system responsive to distance measurements to region of the scene.

In some embodiments of the present invention, the optics that directs light to the scene focuses light from the illuminator to a plane whose distance relative to the illumination system is fixed. Optionally, the position of the plane is located at infinity. Alternatively, the position of the plane is located at a distance from the illumination system that is an average of distances to scenes that the illumination system is intended to illuminate.

In some embodiments of the present invention, each light providing region provides white light.

In some embodiments of the present invention, each light providing region is controllable to provide R, G and B light in controllable amounts.

In some embodiments of the present invention, each light providing region provides IR light.

In some embodiments of the present invention, the illuminator provides R, G, B and IR light and each light providing region provides one of R, G, B or IR light. Optionally, the light providing regions are grouped in groups of four and wherein each one of the light providing region in a group provides a different one of R, G, B and IR light.

In some embodiments of the present invention, the controller controls intensity of R, G or B light provided by each light providing region so as to control hue, saturation or intensity of light illuminating a region of the scene which is illuminated by light from the light providing region independently of hue saturation and intensity of light illuminating other regions of the scene. Optionally, the photosurface is color sensitive and the controller processes an image of the scene to determine color components of the scene. Optionally, the controller controls intensity of R, G or B light provided by each light providing region so as to control hue, saturation or intensity of light illuminating the scene responsive to the determined color components.

In some embodiments of the present invention, the controller controls the 3D range-camera to repeatedly acquire an image of the scene and determine distances to regions of the scene at a frequency equal to or greater than 25 Hz.

Optionally, following the acquisition of each image, the controller adjusts light provided by the light providing regions to match changes in the positions of one or both of features and objects in the scene relative to their positions in an immediately preceding image of the scene.

Optionally, a time lapse between acquisition of the image and a time at which the illuminator provides light adjusted responsive to the image is sufficiently short so that during the time lapse the positions of features and/or objects of the scene do not change sufficiently to generate a substantial mismatch between the illumination and the scene. Optionally, wherein the time lapse is less than about 50 milliseconds. Alternatively, the time lapse is optionally less than about 25 milliseconds.

In some embodiments of the present invention, the controller is programmable to control the light providing regions to provide desired illumination effects.

There is further provided, in accordance with an embodiment of the present invention, an automotive light for use in a vehicle for illuminating a roadway scene comprising a portion of a road on which the vehicle is located and neighboring regions thereof, the automotive light comprising an illumination system, in accordance with an embodiment of the present invention.

In some embodiments of the present invention, the controller controls the illumination system to determine distances to objects in the roadway scene at different times and uses a change in distance of an object as a function of time to determine if the vehicle and object are closing at a dangerous speed. Optionally, if the controller determines that the vehicle and object are closing at a dangerous speed the controller controls the illumination system to generate an optical cue that alerts the driver to the danger. Optionally, the optical cue comprises a spatial light pattern that the illumination system projects on the object. Optionally, the optical cue comprises a spatial light pattern that the illumination system projects on the road.

In some embodiments of the present invention, the light providing regions are controllable to provide different color light and wherein the optical cue is formed with colored light. In some embodiments of the present invention, the optical cue is time dependent.

In some embodiments of the present invention, the controller processes images of the roadway scene provided by the photosurface to identify road signs in the roadway scene. Optionally, when a roadway sign is identified, the controller controls the light providing regions to direct a beam of light that illuminates the roadway sign.

Optionally, the controller controls the light providing regions so that intensity of light they provide to illuminate signs farther from the vehicle is greater than intensity of light they provide to illuminate signs closer to the vehicle. Optionally, intensity of light provided by the light providing regions to illuminate a road sign is substantially proportional to the square of a distance of the sign from the vehicle.

In some embodiments of the present invention, the photosensor is sensitive to color and the light providing regions are controllable to provide different color light and wherein the controller process an image of the sign to determine its color components and controls hue and saturation of light that illuminates the sign to enhance its readability.

In some embodiments of the present invention, the controller controls the light providing regions to radiate a train of light pulses and following each light pulse the controller gates on the photosurface for a short gate timed with respect to a time at which the light pulse is radiated and having a gate width so that light received by the photosurface during the gate is substantially only light reflected from matter in the air in a small volume of space located a short distance immediately in front of the illumination system and wherein the controller uses an amount of light received by the photosurface during the gates to determine visibility of the atmosphere.

Optionally, the controller adjusts illumination provided by the illumination system responsive to the determined visibility. Alternatively or additionally, light providing regions of the illuminator are controllable to provide visible light at different wavelengths and the controller determines visibility as a function of wavelength. Optionally, the controller adjusts wavelength of visible light provided by the light providing regions to maximize visibility.

In some embodiments of the present invention, the controller controls the 3D range-camera to repeatedly acquire an image of the roadway scene and determine distances to regions of the roadway scene at a frequency equal to or greater than 25 Hz. Optionally, the frequency at which images are taken is a function of speed at which the vehicle is traveling.

Alternatively or additionally, following the acquisition of each image, the controller optionally adjusts light provided by the light providing regions to match changes in the positions of one or both of features and objects in the roadway scene relative to their positions in an immediately preceding image of the roadway scene.

In some embodiments of the present invention, following the acquisition of each image, the controller adjusts light provided by the light providing regions to match changes in the positions of one or both of features and objects in the scene relative to their positions in an immediately preceding image of the scene.

Optionally, a time lapse between acquisition of the image and a time at which the illuminator provides light adjusted responsive to the image is sufficiently short so that during the time lapse the positions of features and/or objects of the roadway scene do not change sufficiently to generate a substantial mismatch between the illumination and the scene. Optionally, the time lapse is less than about 50 milliseconds. Optionally, the time lapse is less than about 25 milliseconds.

In some embodiments of the present invention, the automotive light is a headlight. Optionally, the controller process images provided by the photosurface to identify oncoming vehicles and when an oncoming vehicle is identified, the controller controls the light providing regions to prevent blinding the driver of the oncoming vehicle.

In some embodiments of the present invention, the automotive light is a tail light.

There is further provided, in accordance with an embodiment of the present invention, a light bulb comprising an illumination system according to an embodiment of the present invention. In some embodiments of the present invention, the light bulb is adapted to be installed in a conventional light bulb socket.

There is further provided, in accordance with an embodiment of the present invention, an illumination system for illuminating a scene, comprising: an illuminator having a plurality of substantially contiguous independently controllable light providing regions each of which provides light that illuminates a different region of the scene; optics that directs light from the illuminator to the scene; a photosurface having pixels that is boresighted with the optics and the illuminator; and a controller; wherein the controller controls the photosurface to acquire an image the scene and controls the light providing regions of the illuminator responsive to the image.

There is further provided, in accordance with an embodiment of the present invention, a visual surveillance system comprising an illumination system in accordance with an embodiment of the present invention that illuminates a zone intended for visual surveillance by a watchman. Optionally, the controller controls the range finder to repeatedly image the surveillance zone and processes the images to determine presence of a person in the surveillance zone. Optionally, if the controller determines that a person is present in the surveillance zone the controller controls the light providing regions to generate an optical cue to alert the watchman to the person's presence.

There is further provided, in accordance with an embodiment of the present invention, an automotive light for use in a vehicle for illuminating a roadway scene comprising a portion of a road on which the vehicle is located and neighboring regions thereof the automotive light comprising: an illuminator having a plurality of substantially contiguous independently controllable light providing regions each of which provides light that illuminates a different region of the scene; optics that directs light from the illuminator to the scene; a photosurface having pixels; and a controller; wherein the controller controls the photosurface to acquire an image the roadway scene and controls the light providing regions of the illuminator responsive to the image.

BRIEF DESCRIPTION OF FIGURES

Non-limiting examples of embodiments of the present invention are described below with reference to figures attached hereto. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1:
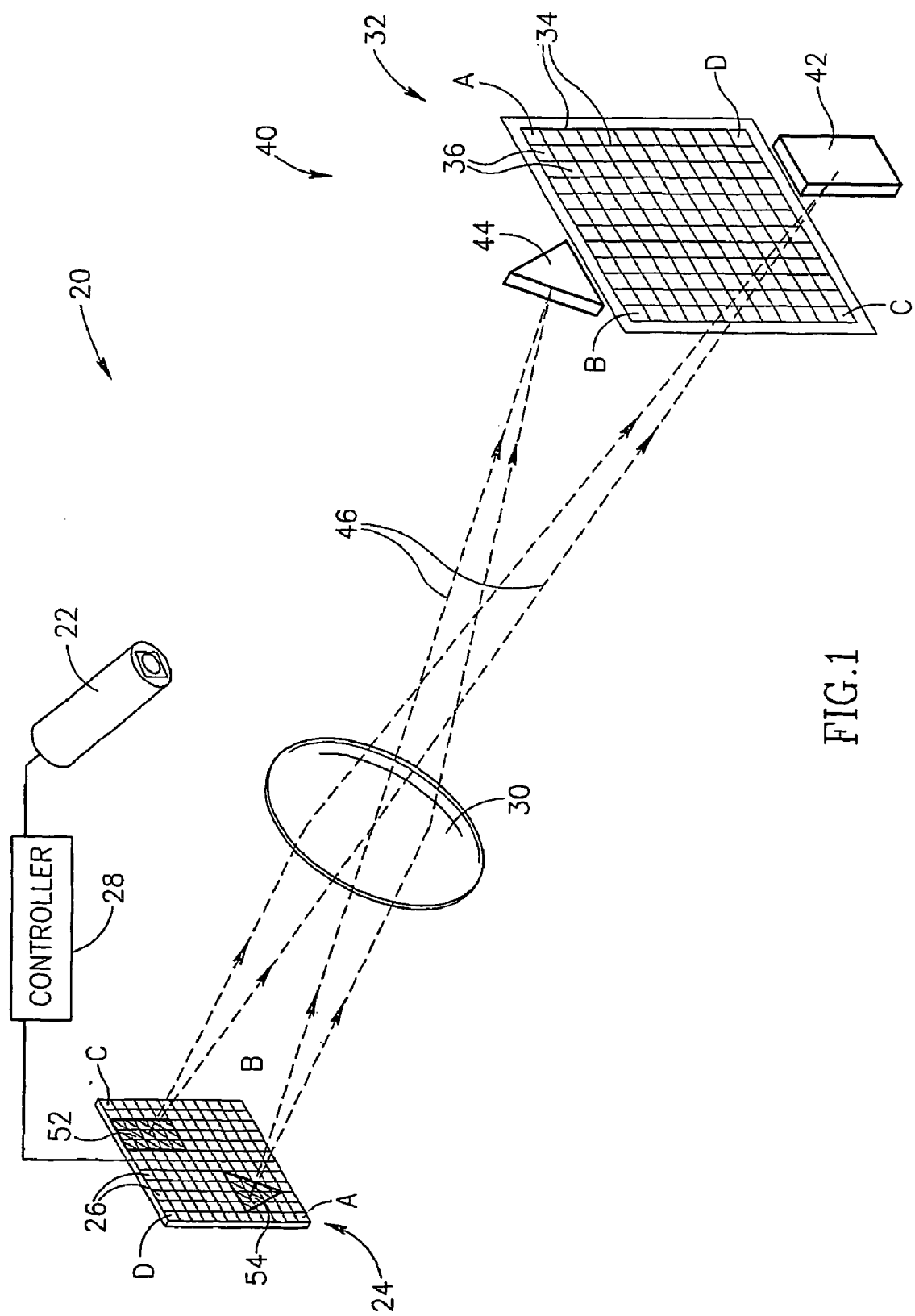
FIG. 1 schematically shows an illumination system illuminating a scene having objects at different distances from the illumination system, in accordance with an embodiment of the present invention.

FIG. 1 schematically shows an illumination system 20, in accordance with an embodiment of the present invention, comprising a range finder 22, an illuminator 24 having luxels, schematically represented by rectangular regions 26 of the illuminator, and a controller 28.

Luxels 26 may provide and control light by emission, reflection or transmission, or a combination of these processes. For example, luxels 26 may comprise one or a combination of light sources, such as for example semiconductor lasers, that provide light by emission, micromirrors that provide light by reflection and/or liquid crystal cells that provide light by transmission.

In some embodiments of the present invention, luxels 26 are "color" luxels, for which spectrum and intensity of light provided by the luxels can be controlled to provide different color light. For example, in some embodiments of the present invention, luxels 26 are "RGB" luxels controllable to provide different combinations of R, G and B light so as to control hue, saturation and intensity of light illuminating a scene. In some embodiments of the present invention, luxels 26 are "gray level" luxels that provide light having a fixed spectrum and for which only intensity of light provided by the pixels is varied. In some embodiments of the invention the luxels may comprise binary "on-off" light sources. In some embodiments of the present invention light provided by luxels 26 is not limited to the visible spectrum but may, for example, comprise infrared or ultraviolet light.

Light from luxels 26 is preferably directed by optics represented by a lens 30 to a scene that is illuminated illumination system 20, which optics focuses light from luxels 26 to an illumination plane 32. Whereas, in FIG. 1, a single lens represents the optics that directs light from illuminator 24 to illuminate a scene, the optics may comprise any suitable optical system, which may have a plurality of lenses and optical elements, as known in the art.

Each luxel 26 provides light that illuminates a different region of illumination plane 32. Illumination plane 32 is shown with a grid of mesh lines 34 that divides the area of illumination plane 32 into square mesh regions 36. Mesh squares 26 schematically represent the different regions of illumination plane 32 that are illuminated by luxels 26. Each mesh square 36 is illuminated by light from a different, substantially only one, luxel 26. Some mesh squares 36 are labeled with letters. A corresponding luxel 26 in illuminator 24 that provides light that illuminates a labeled mesh square 36 is labeled with the same letter.

In some embodiments of the present invention, distance of illumination plane 32 from illumination system 20 is adjustable and the illumination plane can be positioned so that it is suitably located within a scene being illuminated by illumination system 20. In some embodiments of the present invention, illumination plane 32 is located at a predetermined fixed distance from illumination system 20. Optionally, the fixed distance is equal to a suitable average distance from illumination system 20 of scenes that the illumination system is intended to illuminate. Optionally, illumination plane 32 is located at infinity.

Controller 28 controls range finder 22 to determine distances to regions of a scene imaged by illumination system 20 and controls luxels 26 in illuminator 24 responsive to the determined distances. Optionally, for each luxel 26, range finder 22 can be controlled to determine a distance to a region of the scene illuminated with light from substantially only that luxel. For an illumination system, in accordance with an embodiment of the present invention, in which the location of illumination plane 32 can be controlled, controller 28 controls position of illumination plane 32 responsive to distances to regions of a scene illuminated by the illumination system. Generally controller 28 controls position of illumination plane 32 so that it is located substantially at a center of the scene.

Many different types of range finders are available and many of these types of range finders are suitable for use in the practice of the present invention. For example, range finder 22 can be a time of flight range finder, a triangulation range finder, or a 3D range-camera such as described in PCT Publication WO 01/18563 and U.S. Pat. Nos. 6,057,909, 6,091,905 and 6,100,517 referenced above. In some embodiments of the present invention, controller 28 controls each luxel 26 to provide light having an intensity at the luxel that is substantially proportional to a square of a distance from illumination system 20 to a region of the scene illuminated by the luxel. As a result, since intensity of light from a light source generally decreases substantially as the inverse square of distance from the light source, objects in the scene at different distances from illumination system 20 are illuminated with light having substantially a same intensity. Objects in the scene at greater distances from illumination system 20 are therefore more easily discerned and their features more easily observed than would generally be possible were the scene illuminated with conventional lighting.

By way of example, in FIG. 1 illumination system 20 is shown illuminating a scene 40 having a rectangular object 42 and a triangular object 44. Object 44 is closer to illumination system 20 than is object 42. Illumination plane 32 is shown positioned substantially in the center of scene 40 between objects 42 and 44. Luxels 26 that illuminate rectangular object 42 are shown within a shaded rectangular region 52 of illuminator 24 and luxels 26 that provide light that illuminates triangular object 44 are shown within a shaded triangular region 54 on illuminator 24. Dashed lines 46 in FIG. 1 represent selected light rays from luxels 26 in regions 52 and 54 that illuminate rectangular and triangular objects 42 and 44 respectively. Arrows on the lines indicate direction of travel of light.

Let intensity of light provided by luxels 26 that illuminate rectangular and triangular objects 42 and 44 be represented by 142 and 144 respectively. Let distances to rectangular and triangular objects 42 and 44 from illumination system 20 that are determined by range finder 22 be represented by D42 and D44 respectively. In accordance with an embodiment of the present invention, to provide substantially equal illumination of objects 42 and 44 controller 28 controls luxels in regions 52 and 54 of illuminator 24 so that $I42/I44 \cong D42^2/D44^2$.

In some embodiments of the present invention, controller 28 controls luxels 26 in illuminator 24 so that luxels that provide light to illuminate regions of a scene located at a distance from illumination system 20 greater than (or less than) a desired predetermined distance are turned off. As a result, features and objects in a scene at distances greater than (or less than) the predetermined distance are substantially blanked or hidden from view. Such a blanking function can be advantageous, for example, for hiding a background of a stage during changes of scenery. Such a function can also be advantageous, for example, to blank a background of an image of a participant in a videoconference that is transmitted to other participants to the videoconference. By removing background from the participant's image, the participant's privacy is increased, e.g. objects and features of the participant's venue and people therein that the participant does not want other participants in the videoconference to see are sequestered.

It is noted that one function of an embodiment of the present invention does not necessarily exclude another. For example, in accordance with an embodiment of the present invention, a scene can be blanked to sequester features of the scene and intensity of illumination of portions of the scene that are illuminated controlled responsive to their respective distances from the illumination system.

Optionally, controller 28 is a programmable controller that can be programmed, as needed, to control luxels 26 to provide different desired illumination effects.

Figure 2:
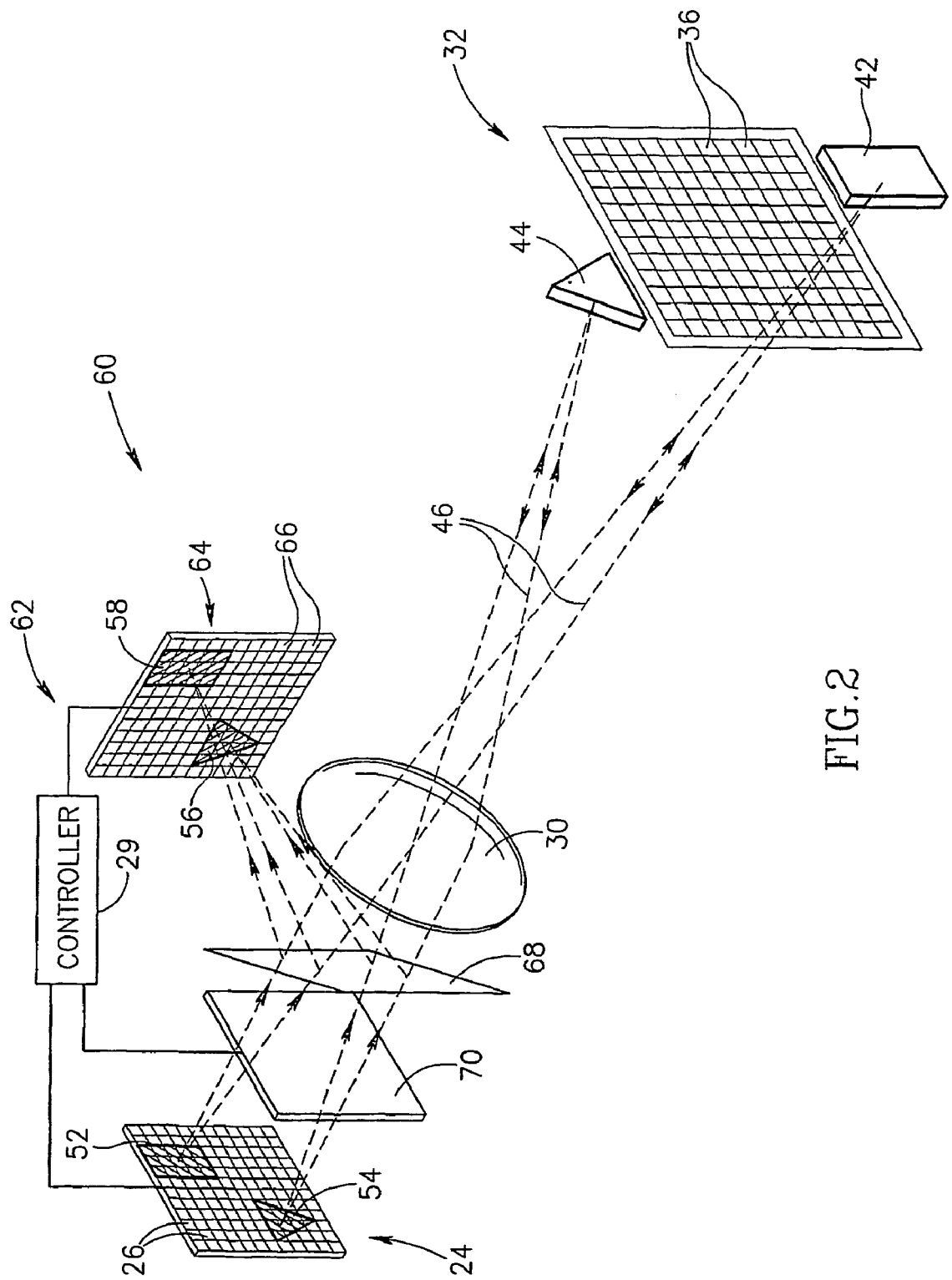
FIG. 2 schematically shows an illumination system comprising a 3D range-camera, in accordance with an embodiment of the present invention.

FIG. 2 schematically shows an illumination system 60 comprising a range finder comprising a gated 3D range-camera 62, in accordance with an embodiment of the present invention. Illumination system 60 is shown by way of example illuminating scene 40 shown in FIG. 1.

3D range-camera 62 is integrated with an illuminator 24 and lens 30 that directs light from the illuminator to scene 40. 3D range-camera 62 comprises a photosurface 64 such as a CCD or CMOS light sensitive surface, having pixels 66. Photosurface 64 is boresighted with lens 30 and illuminator 24 using an appropriate beam splitter 68 and optical elements (not shown) as might be required, so that optimally, a virtual image of the photosurface is substantially coincident with the illuminator. Lens 30 functions not only to direct light from illuminator 24 to illuminate scene 40 but also collects light from the scene for imaging on photosurface 64. Light from illuminator 24 is incident on beam splitter 68, which transmits a portion of the incident light to lens 30 which in turn directs the received light to illuminate scene 40. Light from scene 40 collected by lens 30 is transmitted to beam splitter 68, which directs a portion of the collected light to photosurface 64 to image the scene on the photosurface. In addition, 3D range-camera optionally comprises a fast shutter 70, optionally placed in front of illuminator 24 to shutter light from the illuminator. Dashed, lines 46 indicate selected light beams from illuminator 24 to scene 40 and from scene 40 to photosurface 64. Arrows on lines 46 indicate direction of motion of light in the light rays.

It is noted that in general, for a virtual image of photosurface 64 to substantially coincide with illuminator 24, the size of photosurface 64 does not have to be the same as the size of illuminator 24. However, in order for a virtual image of photosurface 64 to be substantially coincident with illuminator 24, photosurface 64 or a real or virtual image of the photosurface generated by appropriate optics must have a same size and shape as the illuminator. In FIG. 2 and figures that follow, for convenience of exposition, photosurface 64 is shown, by way of example, as having a same size as illuminator 24. Photosurface 64 is therefore shown boresighted with photosurface 22 without additional optics that change its size to provide an appropriate real or virtual image of the photosurface that has substantially a same size as illuminator 24. Alternatively, in some embodiments of the present invention for which the size of photosurface 64 is not the same as illuminator 24 such additional optics may be used. (It is noted that beam splitter 70 also generates a virtual image of illuminator 24 and if photosurface 64 and illuminator 24 do not have a same size appropriate optics can be used to generate a virtual or real image of illuminator 24 that coincides with photosurface 64.) Photosurface 64 may be boresighted with illuminator 24 using methods similar to those described in U.S. patent application Ser. No. 09/250, 322 referenced above.

3D range-camera 62 operates to determine distances to regions of scene 40 similarly to the way in which gated 3D range-cameras described in PCT Publication WO 01/18563, and U.S. Pat. Nos. 6,057,909, 6,091,905 and 6,100,517 referenced above operate. A controller 29 controls shutter 70 to shutter light from illuminator 24 and provide a train of light pulses that illuminates scene 40. Optionally, illuminator 24 provides IR light and the train of light pulses comprises IR light pulses. Following each light pulse, controller 29 gates open photosurface 64 for at least one gate to receive light reflected from the light pulse by regions in scene 40 that is collected by lens 30. Lens 30 directs the collected light to beam splitter 68, which reflects some of the light to photosurface 64 to image the collected light on the photosurface. Distance to a region of scene 40 that is imaged on a pixel 66 of photosurface 64 is determined from timing of the gates with respect to emission times of the light pulses, the widths of the pulses and gates and a total amount of light that is collected by the pixel during the gates. Methods of determining distances to regions of a scenes imaged with a gated 3D range-camera are well known in the art and are described, for instance, in the referenced documents, WO 01/18563, and U.S. Pat. Nos. 6,057,909, 6,091, 905 and 6,100,517.

Controller 28 controls luxels 26 to provide light for illuminating scene 40 responsive to distance measurements determined by 3D range-camera 62. Since a virtual image of photosurface 64 is substantially coincident with illuminator 24 photosurface 64 is focused to a plane that is substantially coincident with illumination plane 32. Therefore, photosurface 64 images substantially only and substantially all of a scene illuminated by light from illuminator 24 and each pixel 66 in photosurface 64 measures distance to a region of scene 40 that is illuminated by a known corresponding luxel or luxels 26 in illuminator 24. For example, in FIG. 2 objects 42 and 44 are imaged on pixels 66 shown in shaded areas 56 and 58 respectively of photosurface 64. Pixels 66 in shaded areas 56 and 58 of photosurface 64 correspond to luxels 26 in shaded regions 52 and 54 of illuminator 24 that illuminated objects 42 and 44 respectively. In some embodiments of the present invention there is a one to one correspondence between pixels 66 of photosurface 64 and luxels 26 in illuminator 24. For each luxel 26 in illuminator 24, there is a different corresponding pixel 66 in photosurface 64 optionally having substantially a same size and shape as the luxel. Each pixel 66 therefore images substantially only and all of a different single mesh region 36 of illumination plane 32. A distance determined from light incident on a pixel 66 is a distance of a region of scene 40 illuminated by illumination system 60 that is illuminated by light from substantially only the pixel's corresponding luxel 26.

Figure 3:
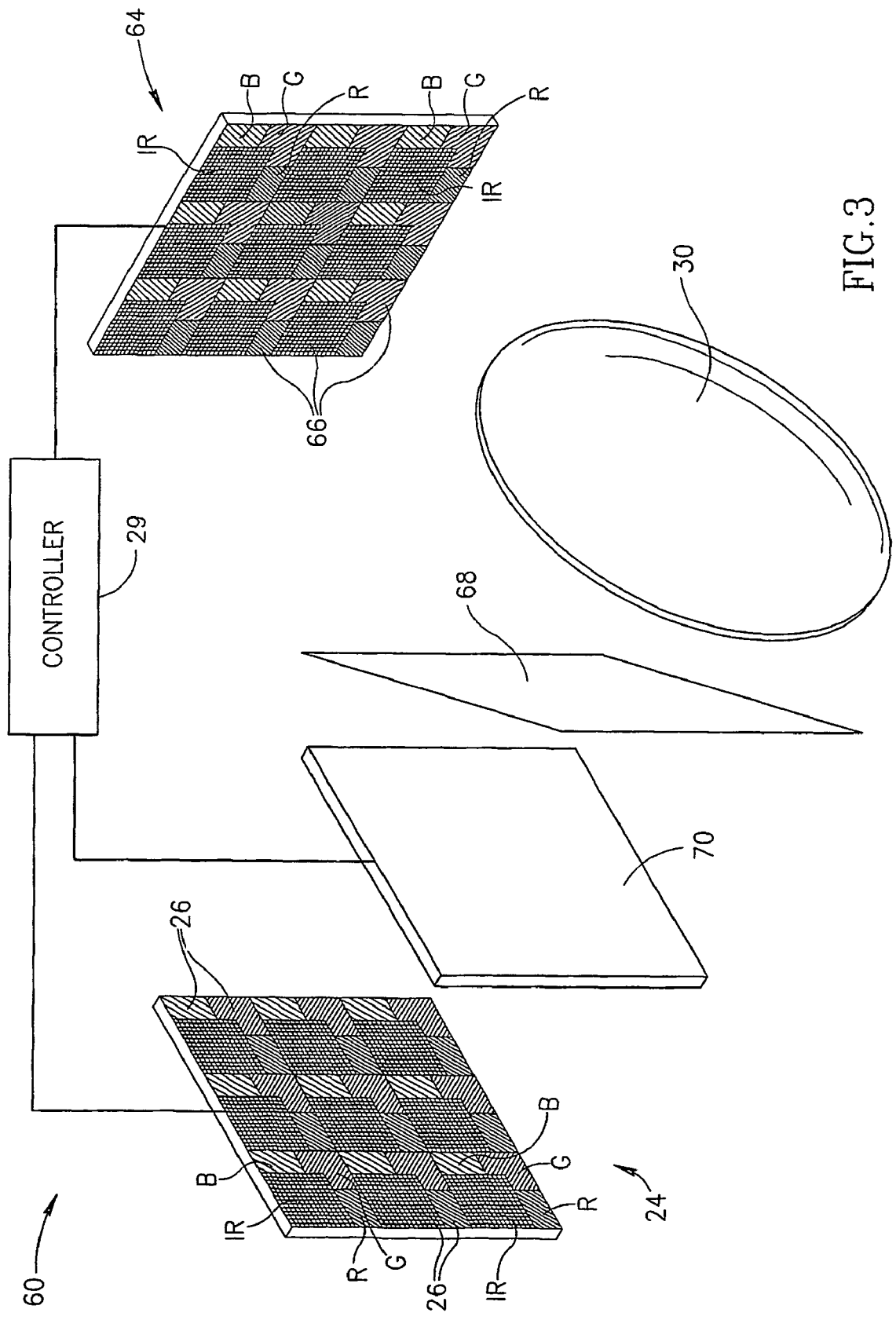
FIG. 3 schematically shows an enlarged view of the illumination system shown in FIG. 2, which shows details of an illuminator and photosurface of the illumination system, in accordance with an embodiment of the present invention.

FIG. 3 schematically shows an enlarged image of illumination system 60 in which there is a one to one correspondence between luxels 26 in illuminator 24 and pixels 66 in photosurface 64. In the enlarged view only some of pixels 66 and luxels 26 are shown. Optionally, pixels 66 in photosurface 64 comprise different pixels for sensing R, G, B and IR light. R, G, B and IR pixels in photosurface 64 are distinguished by different shadings and some of the pixels are identified by R, G, B and IR labels. Optionally photosurface 64 is similar to photosurface 64 described in PCT/IL00/00838 and pixels 66 have a tiling pattern as shown in FIG. 3. In the tiling pattern pixels 66 are grouped into groups of four pixels, wherein each group comprises an R, G, B and IR pixel. A group of four R, G, B and IR pixels 66 optionally has a square area and the IR pixel 66 in the group optionally has an area larger than areas of other pixels in the group. Illuminator 24 has a substantially same tiling pattern of corresponding R, G, B and IR luxels. By way of example R, G, B, and IR luxels 26 may be suitable laser or LED diodes.

In some embodiments of the present invention, there is a one to many correspondence between luxels and pixels and a region of a scene illuminated by a luxel is imaged on a plurality of pixels. In some embodiments of the present invention, there is a many to one correspondence between luxels and pixels and a region of a scene illuminated by a plurality of luxels is imaged on a single pixel 66.

Figure 4:
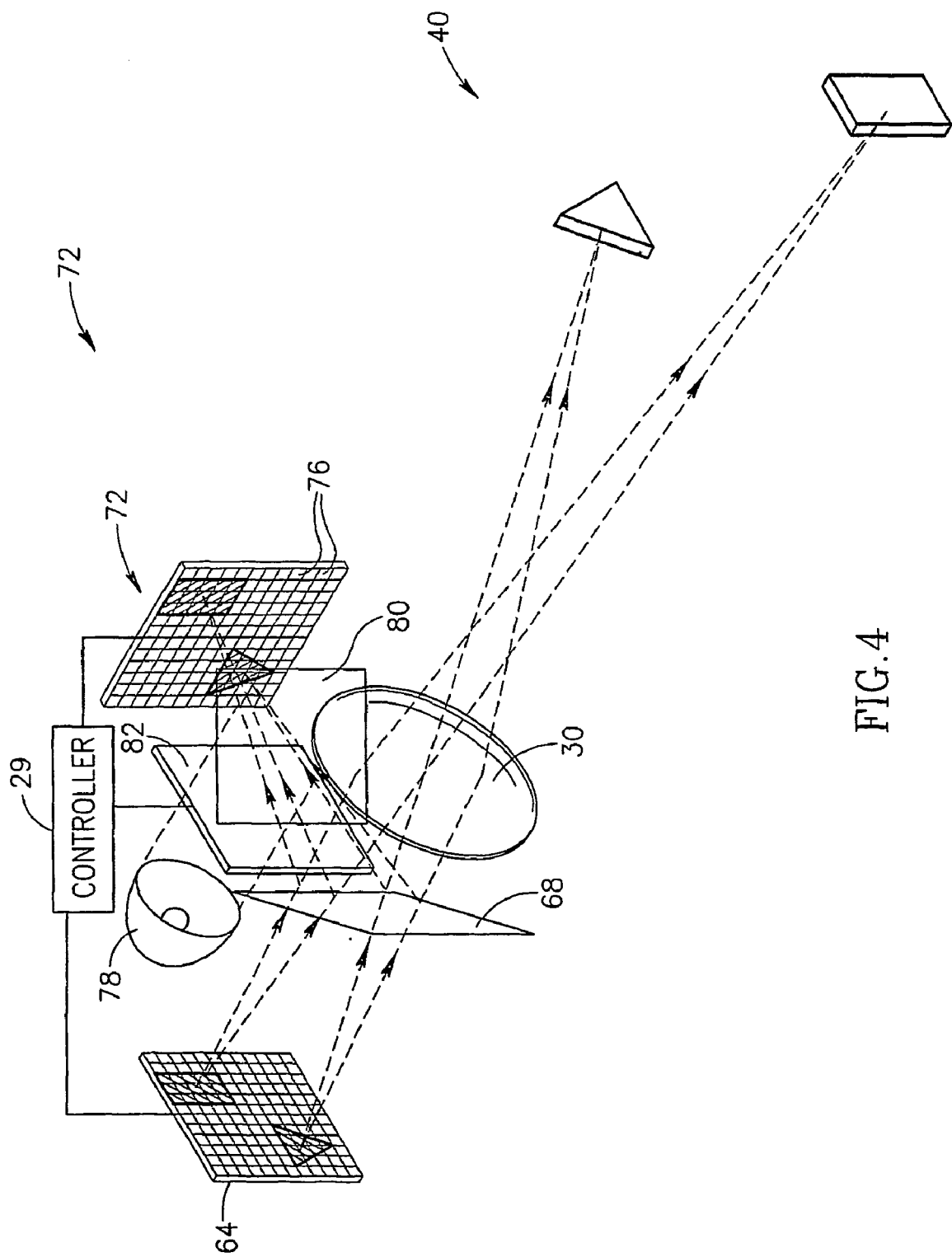
FIG. 4 schematically shows another illumination system comprising a 3D range-camera, in accordance with an embodiment of the present invention.

FIG. 4 shows an illumination system 72 comprising an illuminator 74 having luxels 76 that provide light for illuminating scene by reflecting light from a suitable light source 78, in accordance with an embodiment of the present invention. Illumination system 72 is shown by way of example illuminating scene 40. An illumination plane of illumination system 72 is not shown.

Light from light source 78 is directed to illuminator 74 by a suitable beam splitter 80 which receives light from light source 78 and directs a portion of the received light to the illuminator. Illuminating system 72 optionally comprises a fast shutter 82 for shuttering light provided by light source 78. Shutter 82 is optionally located between light source 78 and beam splitter 80. In some embodiments of the present invention, light source 78 and/or luxels 76 can be turned on and turned off sufficiently rapidly so that shuttering of light provided by light source 78 and illuminator 74 is accomplished by controlling the light source and/or controlling luxels 76. As in illumination system 60, illumination system 72 comprises a controller 29 and a photosurface 64 boresighted with a lens 30 and illuminator 74 using a beam splitter 68.

Whereas light source 78 is schematically shown, by way of example, as an incandescent lamp, light source 78 may comprise any suitable light source, such as for example a laser or LED, an array of lasers or LEDs, a flash lamp, or an arc source and an integrating sphere. Light source 78 may also comprise optical elements required to collimate and/or direct light from the light source so that the light is appropriately incident on beam splitter 80.

In some embodiments of the present invention, each luxel 76 in illuminator 74 comprises a liquid crystal (LC) cell (not shown) having a front surface that faces beam splitter 80 and its own reflecting electrode (not shown) at a back surface of the cell. Light from light source 78 that enters a luxel 76 enters the LC cell of the luxel and is reflected back out the luxel by the luxel electrode. Voltage applied to the luxel's electrode controls transmittance of the luxel's LC cell and therefore intensity of light that exits the luxel. Light that exits luxel 76 is incident on beam splitter 80, which transmits some of the light to beam splitter 68. Beam splitter 68 in turn reflects a portion of the light to illuminate scene 40. Controller 29 controls voltages applied to the electrodes of luxels 76 and controls thereby light from the luxels that illuminates scene 40.

In some embodiments of the present invention, light source 78 provides light having a spectrum that simultaneously comprises R, G, B and IR light and each luxel electrode reflects substantially only one of R, G, B or IR light. A luxel 76 illuminator 74 therefore provides either R, G, B or IR light. R, G and B luxels 76 may be tiled in groups of four luxels, each group of four luxels comprising an R, G, B and IR luxel, similar to the way in which luxels 26 are tiled in illuminator 24 as shown in FIG. 3.

In some embodiments of the present invention, light source 78 is controllable to sequentially provides R, G, B and IR light for illuminating luxels 76, such as by controlling suitable optical filters and/or a suitable array of lasers or LEDS comprised in the light source. Electrodes of luxels 76 are "white" reflectors characterized by a substantially same reflectivity for R, G, B and IR. Controller 29 controls light source 78 to illuminate illuminator 74 sequentially with R, G and B light and controls luxels 76 in synchrony with R, G, B, and IR light from the light source to provide desired illumination of scene 40. In some embodiments of the present invention for which pixels 66 in photosurface 64 are tiled as shown in FIG. 3, each luxel 76 optionally corresponds to a group of four pixels 66. Light from a luxel 76 illuminates a region of scene 40 that is imaged on all its corresponding group of four pixels 24.

It is noted that whereas illuminator 24 optionally provides IR light for determining distances to a scene and is shown in FIG. 4 having IR luxels, in some embodiments of the present invention illuminator 24 does not have IR luxels and distance measurements can, optionally be performed with R, G or B light.

In some embodiments of the present invention, illuminator 74 is a digital mirror device, a "DMD" device, and each luxel 76 comprises a micromirror (not shown). Controller 29 controls the micromirrors, using methods known in the art, to control illumination of scene 40.

Some illumination systems, in accordance with embodiments of the present invention, determine whether regions of a scene are moving from measurements of distances to the scene and control illumination of the scene responsive to moving regions of the scene and/or to components of their velocity of motion.

"Radial" velocity of motion of a region towards or away from the illumination system is determined from measurements of distances to regions of the scene provided at different times by the illumination system's range finder. Differences in the measured distances to a region and times at which the measurements are made are used to determine a radial velocity of the region towards or away from the illumination system. In some illumination systems, in accordance with an embodiment of the present invention, the radial velocity of a region of a scene is used to determine a rate at which to zoom optics of the illumination system so as to properly illuminate the region. In a headlight, in accordance with an embodiment of the present invention, as discussed below, a radial velocity determination is used to determine a closing speed between two vehicles.

In some embodiments of the present invention, an illumination system that controls illumination of a scene responsive to motion of a region of the scene is used in a visual surveillance system to illuminate a surveillance area that is to be protected from unwanted trespass. If a person enters the protected area, the illumination system detects motion of the person towards the illumination system. In response to the person's presence, the illumination system's controller controls luxels to generate an optical cue to draw attention to the person's presence. For example, the illumination system's controller might control illumination of the area to illuminate the person with an "aberrant" light pattern or color light that draws attention to the person's presence. For example, the intruder might be illuminated with flashing and/or bright red light. If the protected area is displayed on a monitor for visual surveillance by a watchman, the aberrant illumination of the person provides a visual stimulus that draws the watchman's attention to the monitor and the person's presence.

In accordance with some embodiments of the present invention the illumination system is programmable to distinguish between types of behavior of a person in the protected area and illuminate the person responsive to his or her behavior. For example, the illumination system is optionally programmed to distinguish between a person walking in the protected area and a person running in the protected area and to illuminate a person with an aberrant illumination pattern only if the person is running or moving towards or away from the illumination system.

In some embodiments of the present invention, a controller of an illumination system comprising a 3D-range camera, such as illumination system similar to illumination systems 60 and 72 shown in FIGS. 2–4, comprises a pattern recognition application. The pattern recognition application processes, using algorithms and methods known in the art, images of a scene illuminated by the illumination system that are provided by the photosurface of the 3D range-camera to identify features and/or objects in the scene that are of interest. The controller controls illumination of the scene responsive to the identified features and/or objects.

Pattern recognition capability in an illumination system, in accordance with an embodiment of the present invention, can be used advantageously for different applications. For example, in the surveillance system described above, if the illumination system comprises a pattern recognition application, the illumination system can be programmed to distinguish between humans and animals entering the protected surveillance area. To reduce needlessly alerting the watchman, the surveillance system might be programmed not to highlight animals with aberrant illumination.

In some embodiments of the present invention, a pattern recognition capability is used to determine a transverse component of velocity of an object in a scene illuminated by an illumination system in a direction substantially perpendicular to a direction along which the illumination system illuminates the scene. In accordance with an embodiment of the present invention, the pattern recognition application identifies position of an image of the object in an image of the scene at different times. The component of velocity is determined from a time rate of change of position of the image of the object and from distance of the object from the illumination system. In some embodiments of the present invention, by way of example, the determined transverse component of velocity of an object is used by the controller to determine how fast to pan a light pattern that highlights the object.

Figure 5:
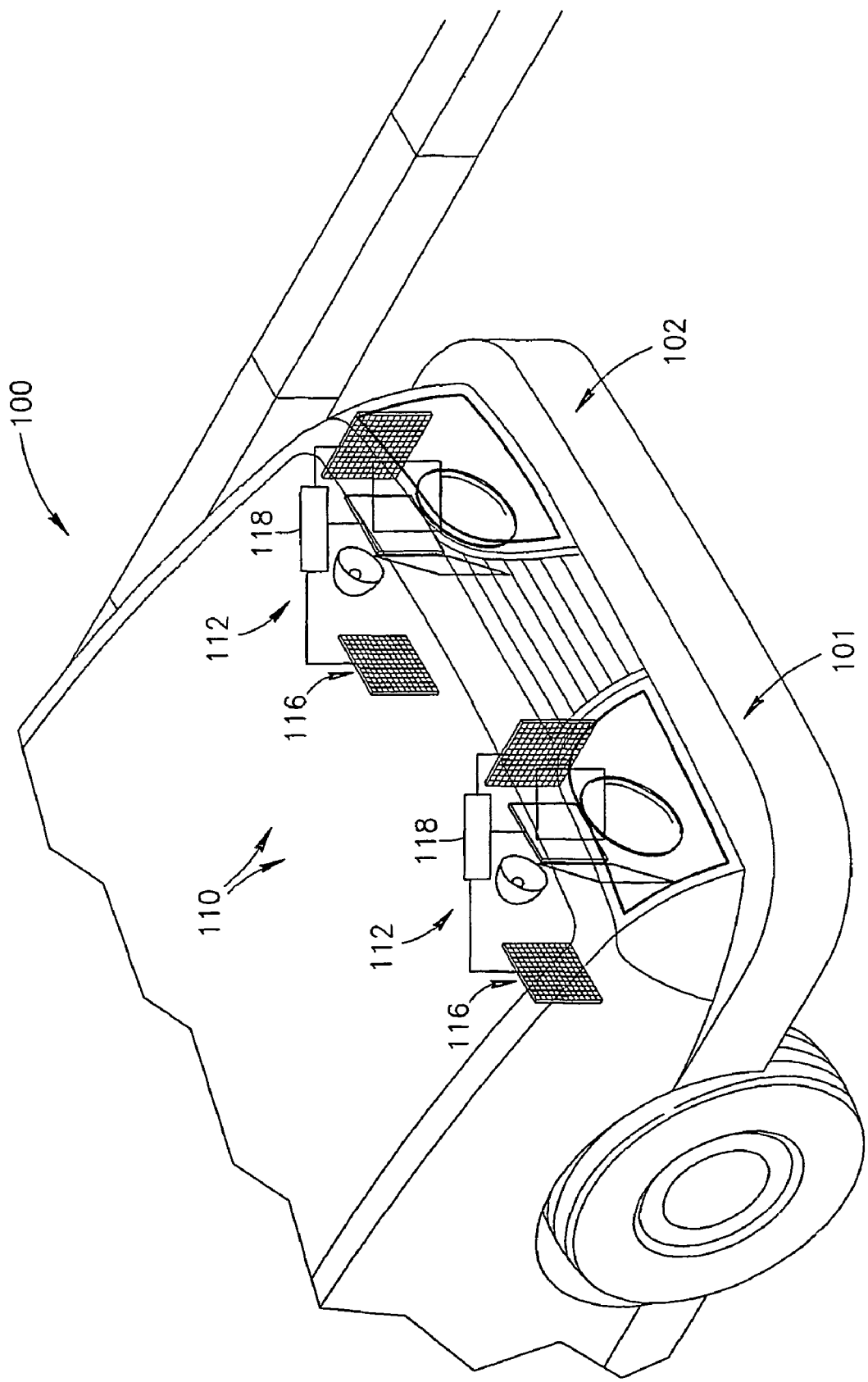
FIG. 5 schematically shows an automotive headlight comprising an illumination system, in accordance with an embodiment of the present invention.

In some embodiments of the present invention, an illumination system in accordance with an embodiment of the present invention is configured to function as an automotive headlight. By way of example, FIG. 5 schematically shows a front end an automobile 100 having headlights 101 and 102 comprising an illumination system 110 similar to illumination system 72 shown in FIG. 4. Illumination system 110 comprises a 3D range-camera 112 having a photosurface 114, an illuminator 116 having luxels and a controller 118. It is assumed that controllers 118 of headlights 101 and 102 have a pattern recognition application. Headlights 101 and 102 provide illumination of a roadway scene as seen by a driver of vehicle 100 that is responsive to objects in, and features of, the roadway scene.

Whereas in FIG. 5, each headlight 101 and 102 is shown having its own controller 118, in some embodiments of the present invention, the headlights share a common controller. The common controller controls both headlights responsive to the roadway scene and coordinates light provided by illuminators 116 of the headlights to appropriately illuminate the roadway. In some embodiments of the present invention one of controllers 118 is a slave controller subordinate to the other of controllers 118, which functions as a master controller. The master controller coordinates light provided by illuminators 116 of headlights 101 and 102. In some embodiments of the present invention headlights 101 and 102 share a common 3D range-camera. The 3D range-camera might be mounted in one of the headlights or in some other suitable location on the vehicle. For example, the 3D range-camera might be might be installed in the grillwork, bumper or bonnet of the vehicle.

Figure 6:
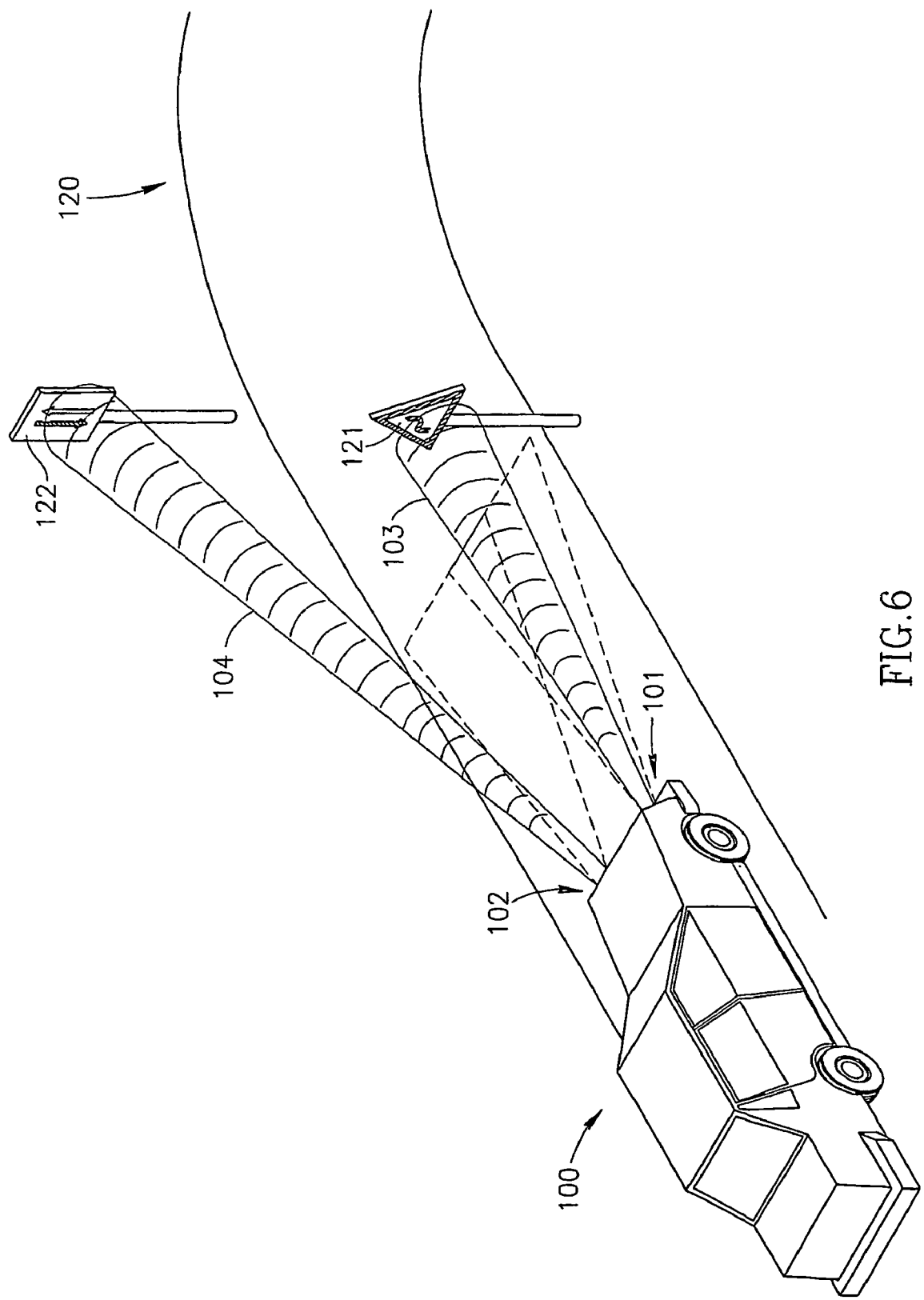
FIG. 6 schematically illustrates functioning of an automotive headlight, in accordance with an embodiment of the present invention.

FIG. 6 schematically shows headlights 101 and 102 of vehicle 100 shown in FIG. 5 responding to road signs 121 and 122 along a roadway 120 on which vehicle 100 is traveling. By way of example, road sign 122 is farther from vehicle 100 than is road sign 121. In the discussion below, one of controllers 118 shown in FIG. 5 is considered to be a master controller and the other is considered to be a slave to the master. Reference to a controller 118 in the following discussion refers to the combination of master and slave controller, which control operation of headlights 101 and 102.

In accordance with an embodiment of the present invention, 3D range-cameras 112 (FIG. 5) image the roadway scene and determine distances to objects and features in the scene. The pattern recognition application processes the images of the roadway scene and identifies roadway signs 121 and 122. Controller 118 optionally controls luxels in illuminators 116 of headlights 101 and 102 to provide light beams 103 and 104 that spotlight roadway signs 121 and 122 respectively. Since road sign 102 is further from vehicle 100 than is road sign 101, controller 118 controls luxels in headlight 102 that illuminate roadway sign 122 to provide light at intensity greater than light provided by luxels in headlight 101 that illuminate roadway sign 121. In some embodiments of the present invention, intensity of light provided by luxels that illuminate each roadway sign 121 and 122 is proportional to $D^2$ where D is the distance of the roadway sign from vehicle 100.

In some embodiments of the present invention, controller 118 determines colors of roadway signs 121 and 122 from images of the roadway signs and adjusts hue and saturation of light that spotlights the roadway signs to improve readability of the roadway signs. For example, controller 118 might determine that roadway signs 121 and 122 are painted in yellow and green and control luxels in headlights 101 and 102 to illuminate the signs with predominantly yellow and green light. Hereinafter, distances to a roadway scene, color components of a roadway scene and data identifying objects and features of the scene and their locations in the scene are referred to individually and collectively as "roadway scene data".

It is noted that as vehicle 100 moves along a roadway, roadway scene data changes. For example as vehicle 100 moves along roadway 120 in FIG. 6, distances from the vehicle to road signs 121 and 122 and azimuthal and elevation positions of the road signs in the roadway scene (as seen by the driver) change. In accordance with an embodiment of the present invention, light provided by headlights 101 and 102 to illuminate a roadway scene is updated to accommodate changes in roadway scene data.

Optionally, illumination of the roadway scene is updated at a frequency of at least 25 Hz to provide visual continuity. At a time prior to a time at which illumination is updated, controller 118 controls headlights 101 and 102 to image the roadway scene and uses the images to update roadway scene data. The updated roadway scene data is used to update illumination of the roadway scene. Preferably, a time lapse between a time at which roadway scene data is updated and a subsequent time at which the updated data is used to update illumination of the roadway scene, is sufficiently short so that an illumination pattern provided by headlights 101 and 102 properly tracks objects and features of the roadway scene.

For example, assume vehicle 100 is moving at 100 km/h, and road sign 122 is located at an azimuth of 45° with respect to vehicle 100 and at a distance of about 10 meters from the vehicle. Assume further that road sign 122 has dimensions of about of a meter and that beam of light 104 that illuminates the road sign has a cross sectional diameter of about a 2 meters. To position light beam 104 to track road sign 122, roadway scene data should be updated at a maximum lead-time prior to updating illumination of the roadway scene that is less than about 25 milliseconds. It is noted that the maximum update lead-time decreases as the azimuth position of road sign 122 increases (the azimuth increases as the vehicle approaches the sign) and distance of the road sign to vehicle 100 decreases. However, there is a limited range of distances and azimuth angles of objects and features of a roadway scene that are generally of interest and relevance to a driver of a vehicle. Furthermore, vehicle speeds generally do not exceed a maximum of about 200 km/hr. Therefore, a maximum lead-time, in accordance with an embodiment of the present invention, for updating roadway scenes that is satisfactory for most driving conditions can be established. It should also be noted that in some situations, for example for travel at a steady speed it may be possible to calculate how to adjust illumination to track objects and features of a roadway scene. For such situations lead-time and frequency constraints on updating roadway scene data can be relaxed.

In some embodiments of the present invention, headlights 101 and 102 are programmed to detect atmospheric effects that reduce roadway visibility and adjust roadway illumination provided by the headlight accordingly. For example, in accordance with an embodiment of the present invention, headlights 101 and 102 are programmed to detect fog and adjust light provided by their respective illuminators 116 to provide light appropriate for driving in fog. Fog is detected, in accordance with an embodiment of the present invention, by measuring back-scatter from light provided by headlights 101 and/or 102. Controller 118 measures back-scatter, optionally, by controlling each headlight 101 and/or 102 to transmit a train of light pulses in a direction directly forward from the headlights and substantially parallel to the roadway. Following each light pulse, controller 118 gates on photosurface 116 of the headlight for a short gate period. During the gate period photosurface 116 receive light reflected from the light pulse from a limited volume of space located a short distance immediately in front of vehicle 100, for which volume there are no reflecting objects except particulate matter in the air. An amount of light registered by photosurface 116 during the short gates is due to back scatter from particulate matter in the air that causes fog and is used to determine presence of fog and fog characteristics. In some embodiments of the present invention back-scatter is measured for visible light provided by headlights 101 and 102. In some embodiments of the present invention, back-scatter is measured as a functon of color of light provided by headlights 101.

It is noted that whereas headlights 101 and 102 comprise an illumination system similar to illumination system 72 (FIG. 4), which is assumed to have pattern recognition capability, some headlights in accordance with an embodiment of the present invention do not have all features of headlights 101 and 102. For example, headlights in accordance with an embodiment of the present invention optionally comprise a range finder, which is not a 3D range-camera that images a roadway scene illuminated by the headlights as well as determine distances to the roadway scene. Some headlights, in accordance with an embodiment of the present invention, may not have pattern recognition capability or might have pattern recognition capability without range finding capability. Variations of headlights, in accordance with an embodiment of the present invention, may provide different combinations of functions and capabilities provided by an illumination system in accordance with an embodiment of the present invention to respond to features and objects of a roadway scene.

Figure 7:
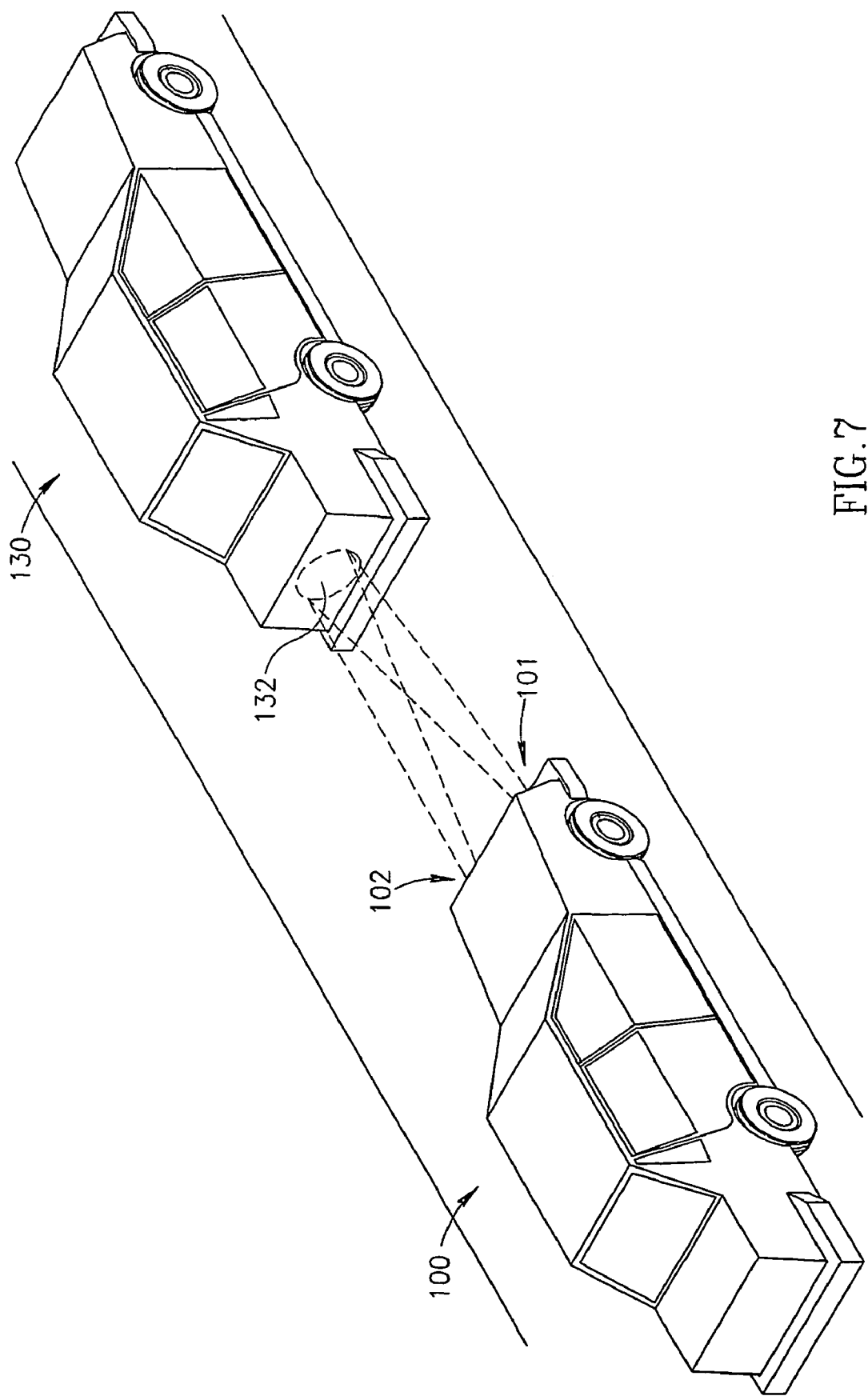
FIG. 7 schematically illustrates automotive headlights alerting a driver to a dangerous closing speed to a vehicle in front of the driver's vehicle, in accordance with an embodiment of the present invention.

FIG. 7 schematically shows headlights 101 and 102 of vehicle 100 responding to a vehicle 130 moving in front of vehicle 100. Controller 118 determines a distance of vehicle 130 from vehicle 100 and a closing speed of vehicle 100 with vehicle 130. If controller 118 determines that vehicle 100 is either too close or is closing on vehicle 130 too quickly headlights 101 and 102 generate an "optical alarm" to visually alert the driver of vehicle 100 of a dangerous situation. For example, in FIG. 7, to alert the driver of vehicles 100 to a dangerous situation headlights 101 and 102 optionally illuminate a circular region 132 of the rear of vehicle 130 with relatively intense light. Illumination of region 132 might optionally be turned on and off or color of the illumination alternated between two or more colors to attract the driver's attention. It is noted that such a visual alarm might also be noticed by the driver of vehicle 130 who might then be able to action to reduce danger of the situation.

Other functions and variations of functions of headlights 101 and 102 and variations thereof, in accordance with embodiments of the present invention will occur to persons of the art. For example, headlights 101 and 102 might "pattern recognize" presence of people in a road in front of vehicle 100 and spotlight the people to alert the driver to their presence. Alternatively, the headlights might illuminate the roadway in front of the vehicle with a visual cue indicating the presence of the people. Headlights 101 and 102 might also recognize presence of obstacle in the roadway and alert the driver to the presence of the obstacles. In some embodiments of the present invention, headlights 101 and 102 generate signals that are input to a visual or audio display inside the vehicle to cue the driver to road conditions.

Whereas an illumination system, in accordance with an embodiment of the present invention, has been described as configured as a headlight, in some embodiments of the present invention an illumination system is configured to function as an automotive tail light. Tail lights in accordance with an embodiment of the present invention function similarly to the way in which headlights in accordance with an embodiment of the present invention function. For example, a tail light in accordance with some embodiments of the present invention, installed in a first vehicle functions to determine if a second vehicle trailing the first vehicle is too close to, or is closing too quickly on the first vehicle. If the tail light determines that the second vehicle is endangering the first vehicle the tail light generates a visual warning to the drivers of the first and second vehicles. For example, to alert the driver of the first vehicle to the danger, the tail light might illuminate a region of the road behind the first vehicle that is visible to the driver in a rearview or side view mirror with a suitable illumination "alarm" pattern. Alternatively, the tail light might generate a signal that causes a visual or audio display inside the first vehicle to alert the first vehicle's driver to the danger. By way of another example, in some embodiments of the present invention, tail lights alert a driver to presence of people behind a vehicle when the vehicle is backing up.

Figure 8:
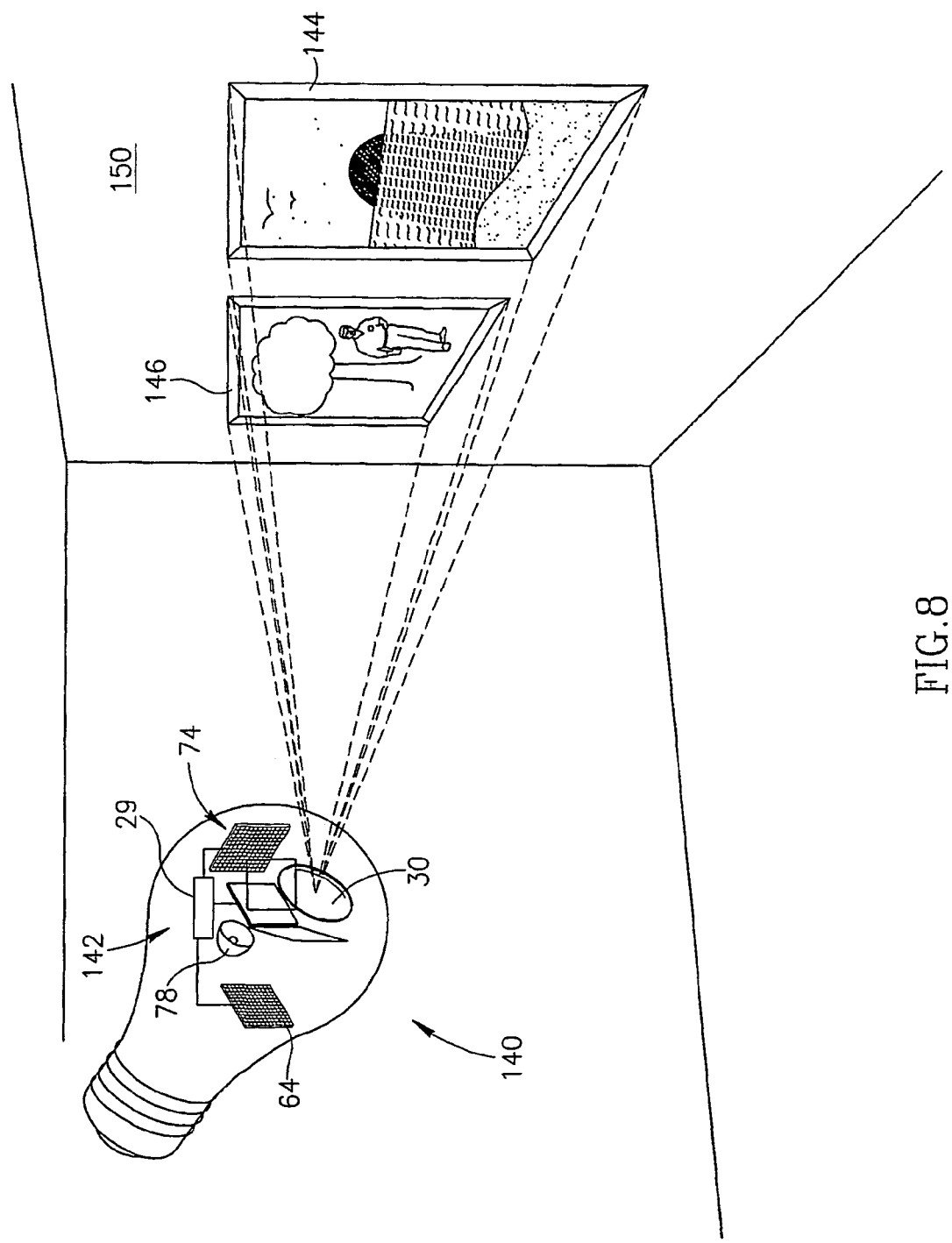
FIG. 8 schematically shows a light bulb comprising an illumination system, in accordance with an embodiment of the present invention.

FIG. 8 schematically shows a light bulb 140 comprising an illumination system 142, in accordance with an embodiment of the present invention. Optionally, illumination system 142 is similar to illumination system 72 (FIG. 4) and provides functions that illumination system 72 provides. Components of illumination system 142 germane to the following discussion are labeled with the same numerals that label corresponding components of illumination system 72.

Light bulb 140 is show illuminating pictures 144 and 146 on a wall 150. A pattern recognition application in light bulb 140 identifies and locates pictures 144 and 146. Controller 29 then controls light provided by light source 78 and illuminator 74 to illuminate pictures 144 and 146 with appropriate lighting. In some embodiments of the present invention, light bulb 140 determines colors in pictures 144 and 146 and illuminates the pictures to enhance the colors. Light bulb 140 can also function as an anti theft alarm. For example, in accordance with an embodiment of the present invention, light bulb 140 is programmable to determine if picture 144 or picture 146 is being moved, and if so the light bulb can trigger a suitable alarm. In some embodiments of the present invention, controller 29 comprises a memory and light bulb 140 is programmable to remember the presence of pictures 144 and 146 on wall 150. If picture 144 or 146 is removed, light bulb 140 "notices" the absence of the picture and sounds an alarm.

Whereas light bulb 140 is shown illuminating pictures on a wall, a light bulb, in accordance with an embodiment of the present invention, similar to light bulb 140 can of course be used for general illumination of a room or area and can be programmed to provide different illumination effects. For example, bulb 140 can be used to illuminate a disco club and can be programmed and controlled to provide different "disco" lighting effects as well as conventional area lighting.

In some embodiments of the present invention, light bulb 140 is preprogrammed with desired functions and a menu of lighting effects. In some embodiments of the present invention, programming of light bulb 140 with a menu of functions and lighting effects is performed by transmitting signals to the light bulb via wires that connect to a socket in which the light bulb is inserted. In some embodiments of the present invention, programming of light bulb 140 with a menu of functions and lighting effects is achieved by wireless transmission of appropriate signals to the controller. Optionally, choosing a particular lighting effect or function from the menu is accomplished by transmission of wireless signals to the light bulb.

It is noted that other lighting systems, in accordance with an embodiment of the present invention, can be programmed with a menu of functions and lighting effects and controlled similarly to the manner in which light bulb 140 is programmed and controlled.

It is also noted that whereas the headlight and bulb as described above are shown as monolithically integrated structures, a head light or bulb, in accordance with embodiments of the present invention can have distributed components. For example, a headlight, in accordance with an embodiment of the present invention may have its illuminator conventionally at the front of the fender, its range-camera in the grillwork and its controller under the dashboard. Similarly a bulb, in accordance with an embodiment of the present mounted in a chandelier may have a controller located in a wall unit, its illuminator in a conventional socket of the chandelier and its 3D-range camera mounted in the chandelier structure.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. An illumination system for illuminating a scene, comprising:
    an illuminator having a plurality of substantially contiguous independently controllable light providing regions each of which provides light that illuminates a different region of the scene;
    optics that directs light from the illuminator to the scene;
    a photosurface having pixels that is boresighted with the optics and the illuminator; and
    a controller;
    wherein the controller controls the photosurface to acquire an image the scene using light from the illuminator reflected by the scene and controls the light providing regions of the illuminator responsive to the image.

2. An illumination system according to claim 1 wherein the controller is programmable to control the light providing regions to provide desired illumination effects.

3. An illumination system according to claim 1 wherein the photosurface is comprised in a 3D camera and the controller controls the 3D camera to determine distances to regions of the scene responsive to the image of the scene and controls the plurality of light providing regions to provide light for illuminating the scene responsive to the distances.

4. A light bulb comprising an illumination system according to claim 1.

5. A light bulb according to claim 4 adapted to be installed in a conventional light bulb socket.

6. An illumination system according to claim 3 wherein the photosurface is a gated photosurface 7. An illumination system according to claim 1 wherein the controller comprises a pattern recognition application which the controller uses to identity features and/or objects in images of the scene formed on the photosurface.

8. An automotive light for use in a vehicle for illuminating a roadway scene comprising a portion of a road on which the vehicle is located and neighboring regions thereof, the automotive light comprising an illumination system according to claim 1.

9. An illumination system according to claim 3 wherein the controller comprises a pattern recognition application which the controller uses to identify features and/or objects in images of the scene formed on the photosurface.

10. An illumination system according to claim 9 wherein the controller controls the light providing regions to provide light that illuminates the scene responsive to one or both of features and objects that it identifies in the image.

11. An illumination system according to claim 9 wherein the controller controls the 3D range-camera to acquire a first image of the scene at a first time and a second image of the scene at a second time and identifies a feature of the scene that has a location in the second image different from its location in the first image.

12. An illumination system according to claim 11 wherein the controller uses the difference in location of the feature a difference between the first and second times, and distance of the feature from the illumination system to determine a transverse component of velocity of the feature in a direction substantially perpendicular to a direction along which the illumination system illuminates the feature.

13. An illumination system according to claim 12 wherein the controller controls the light providing regions to provide light that illuminates the scene responsive to the transverse component of velocity.

14. An illumination system according to claim 3 wherein the controller controls the 3D camera to determine distances to a region of the scene at a first time and a second time and uses a difference in the distances and a difference between the first and second times to determine a radial component of velocity of the region along a direction substantially parallel to a direction along which the illumination system illuminates the region.

15. An illumination system according to claim 14 wherein the controller controls the light providing regions to provide light that illuminates the scene responsive to the radial component of velocity.

16. An illumination system according to claim 3 wherein the controller controls the light providing regions to illuminate only regions of the scene that are located within a desired range of distances from the illumination system.

17. An illumination system according to claim 3 wherein the controller controls intensity of light provided by light providing regions responsive to distances determined by the 3D camera.

18. An illumination system according to claim 3 wherein the controller controls the light providing regions so that relative intensity of light provided by the illuminator that illuminates two different regions of the scene is substantially proportional to a ratio of the squares of their respective distances from the illumination system.

19. An illumination system according to claim 3 wherein the controller controls the 3D range-camera to repeatedly acquire an image of the scene and determine distances to regions of the scene at a frequency equal to or greater than 25 Hz.

20. An illumination system according claim 19 wherein following the acquisition of each image, the controller adjusts light provided by the light providing regions to match changes in the positions of one or both of features and objects in the scene relative to their positions in an immediately preceding image of the scene.

21. An illumination system according to claim 20 wherein a time lapse between acquisition of the image and a time at which the illuminator provides light adjusted responsive to the image is sufficiently short so that during the time lapse the positions of features and/or objects of the scene do not change sufficiently to generate a substantial mismatch between the illumination and the scene.

22. An illumination system according to claim 21 wherein the time lapse is less than about 50 milliseconds.

23. An illumination system according to claim 21 wherein the time lapse is less than about 25 milliseconds.

24. An automotive light for use in a vehicle for illuminating a roadway scene comprising a portion of a road on which the vehicle is located and neighboring regions thereof, the automotive light comprising an illumination system according to claim 3.

25. An automotive light according to claim 24 wherein the controller controls the illumination system to determine distances to objects in the roadway scene at different times and uses a change in distance of an object as a function of time to determine if the vehicle and object are closing at a dangerous speed.

26. An automotive light according to claim 25 wherein if the controller determines that the vehicle and object are closing at a dangerous speed the controller controls the illumination system to generate an optical cue that alerts the driver to the danger.

27. An automotive light according to claim 26 wherein the optical cue comprises a spatial light pattern that the illumination system projects on the object.

28. An automotive light according to claim 26 wherein the optical cue comprises a spatial light pattern that the illumination system projects on the road.

29. An automotive light according to claim 26 wherein the light providing regions are controllable to provide different color light and wherein the optical cue is formed with colored light.

30. An automotive light according to claim 26 wherein the optical cue is time dependent.

31. An automotive light according to claim 24 wherein the controller processes images of the roadway scene provided by the photosurface to identify road signs in the roadway scene.

32. An automotive light according to claim 31 wherein when a roadway sign is identified, the controller controls the light providing regions to direct a beam of light that illuminates the roadway sign.

33. An automotive light according to claim 32 wherein the controller controls the light providing regions so that intensity of light they provide to illuminate signs farther from the vehicle is greater than intensity of light they provide to illuminate signs closer to the vehicle.

34. An automotive light according to claim 33 wherein intensity of light provided by the light providing regions to illuminate a road sign is substantially proportional to the square of a distance of the sign from the vehicle.

35. An automotive light according to claim 24 wherein the photosensor is sensitive to color and the light providing regions are controllable to provide different color light and wherein the controller processes an image of the sign to determine its color components and controls hue and saturation of light that illuminates the sign to enhance its readability.

36. An automotive light according to claim 6 wherein the controller controls the light providing regions to radiate a train of light pulses and following each light pulse the controller gates on the photosurface for a short gate timed with respect to a time at which the light pulse is radiated and having a gate width so that light received by the photosurface during the gate is substantially only light reflected from matter in the air in a small volume of space located a short distance immediately in front of the illumination system and wherein the controller uses an amount of light received by the photosurface during the gates to determine visibility of the atmosphere.

37. An automotive light according to claim 36 wherein the controller adjusts illumination provided by the illumination system responsive to the determined visibility.

38. An automotive light according to claim 36 wherein light providing regions of the illuminator are controllable to provide visible light at different wavelengths and the controller determines visibility as a function of wavelength.

39. An automotive light according to claim 38 wherein the controller adjusts wavelength of visible light provided by the light providing regions to maximize visibility.

40. An automotive light according to claim 24 wherein the controller controls the 3D range-camera to repeatedly acquire an image of the roadway scene and determine distances to regions of the roadway scene at a frequency equal to or greater than 25 Hz.

41. An automotive light according to claim 40 wherein the frequency at which images are taken is a function of speed at which the vehicle is traveling.

42. An automotive light according to claim 40 wherein following the acquisition of each image, the controller adjusts light provided by the light providing regions to match changes in the positions of one or both of features and objects in the roadway scene relative to their positions in an immediately preceding image of the roadway scene.

43. An automotive light according to claim 24 wherein following the acquisition of each image, the controller adjusts light provided by the light providing regions to match changes in the positions of one or both of features and objects in the scene relative to their positions in an immediately preceding image of the scene.

44. An automotive light according to claim 43 wherein a time lapse between acquisition of the image and a time at which the illuminator provides light adjusted responsive to the image is sufficiently short so that during the time lapse the positions of features and/or objects of the roadway scene do not change sufficiently to generate a substantial mismatch between the illumination and the scene.

45. An automotive light according to claim 44 wherein the time lapse is less than about 50 milliseconds.

46. An automotive light according to claim 44 wherein the time lapse is less than about 25 milliseconds.

47. An automotive light according to claim 24 wherein the automotive light is a headlight.

48. An automotive light according to claim 47 wherein the controller process images provided by the photosurface to identify oncoming vehicles and when an oncoming vehicle is identified, the controller controls the light providing regions to prevent blinding the driver of the oncoming vehicle.

49. An automotive light according to claim 24 wherein the automotive light is a tail light.

50. A visual surveillance system comprising an illumination system according to claim 3 that illuminates a zone intended for visual surveillance by a watchman.

51. A visual surveillance system according to claim 50 wherein the controller controls the 3D camera to repeatedly image the surveillance zone and processes the images to determine presence of a person in the surveillance zone.

52. A visual surveillance system according to claim 51 wherein if the controller determines that a person is present in the surveillance zone the controller controls the light providing regions to generate an optical cue to alert the watchman to the person's presence.

* * * * *